US012787056B2

(12) United States Patent
Ciochina-Kar et al.

(10) Patent No.: US 12,787,056 B2
(45) Date of Patent: Nov. 3, 2026

(54) COMMUNICATION DEVICES AND METHODS FOR TXOP TRUNCATION

(71) Applicant: Sony Group Corporation, Tokyo (JP)

(72) Inventors: Dana Ciochina-Kar, Stuttgart (DE); Thomas Handte, Filderstadt (DE); Daniel Verenzuela, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 282 days.

(21) Appl. No.: 18/702,028

(22) PCT Filed: Oct. 11, 2022

(86) PCT No.: PCT/EP2022/078262
§ 371 (c)(1),
(2) Date: Apr. 17, 2024

(87) PCT Pub. No.: WO2023/072584
PCT Pub. Date: May 4, 2023

(65) Prior Publication Data

US 2026/0136386 A1 May 14, 2026

(30) Foreign Application Priority Data

Oct. 29, 2021 (EP) .................................... 21205621

(51) Int. Cl.
*H04W 74/04* (2009.01)
*H04W 28/06* (2009.01)

(52) U.S. Cl.
CPC ........... *H04W 74/04* (2013.01); *H04W 28/06* (2013.01)

(58) Field of Classification Search
CPC .............................. H04W 74/04; H04W 28/06
See application file for complete search history.

(56) References Cited

U.S. PATENT DOCUMENTS 11,343,026 B1 * 5/2022 Chu ...................... H04L 1/1861
2012/0102131 A1 * 4/2012 Lin ......................... H04L 67/61
709/217

(Continued)

FOREIGN PATENT DOCUMENTS

WO 2020/187031 A1 9/2020
WO 2022/090440 A1 5/2022
WO 2022/090441 A1 5/2022

OTHER PUBLICATIONS

International Search Report and Written Opinion mailed on Feb. 13, 2023, received for PCT Application PCT/EP2022/078262, filed on Oct. 11, 2022, 14 pages.
"10. MAC sublayer functional description", IEEE P802.11-REVme/ DO.2, Retrieved from the Internet : URL :http://grouper.ieee.org/groups/802/11/private/Draft_Standards/11me/REVme_DO.2.rtf.zip REVme_C1_10.fm.rtf, Aug. 5, 2021, 312 pages.

(Continued)

*Primary Examiner* — Kenny S Lin
(74) *Attorney, Agent, or Firm* — XSENSUS LLP

(57) ABSTRACT

This disclosure relates to the concept of preempting TXOPs, i.e. suspending a data exchange between communication devices during an ongoing TXOP to serve STAs with latency constraints. According to an embodiment a first communication device is provided that is configured to communicate with a second communication device. The first communication device comprises circuitry configured to perform exchange of data units with the second communication device during a current transmit opportunity, receive, before or during the current transmit opportunity, a truncation notification indicating that the ongoing exchange of data units should be suspended and that a preemptive data unit may be received from and/or transmitted to the third communication device, suspend the ongoing exchange of data units with the second communication device before the end of the transmit opportunity, and receive from and/or transmit to the third communication device the preemptive data unit within the remaining duration of the transmit opportunity.

20 Claims, 20 Drawing Sheets

(56) References Cited

U.S. PATENT DOCUMENTS

| | | | | |
|---|---|---|---|---|
| 2015/0188675 | A1* | 7/2015 | Abeysekera | H04L 5/0007 370/329 |
| 2016/0119805 | A1* | 4/2016 | Aldana | H04W 76/22 370/252 |
| 2018/0206260 | A1* | 7/2018 | Khoryaev | H04W 72/56 |
| 2018/0288800 | A1* | 10/2018 | Yu | H04W 74/0808 |
| 2018/0317242 | A1* | 11/2018 | Park | H04W 74/085 |
| 2019/0306801 | A1* | 10/2019 | Zhou | H04W 52/44 |
| 2019/0306848 | A1* | 10/2019 | Zhou | H04W 72/23 |
| 2020/0281008 | A1 | 9/2020 | Aboul-Magd et al. | |
| 2020/0344747 | A1* | 10/2020 | Park | H04W 72/21 |
| 2020/0367263 | A1 | 11/2020 | Cavalcanti et al. | |
| 2021/0007080 | A1* | 1/2021 | Zhou | H04L 5/0055 |
| 2021/0084667 | A1 | 3/2021 | Bravo et al. | |
| 2023/0121842 | A1* | 4/2023 | Zhang | H04Q 11/0067 398/58 |
| 2024/0129952 | A1* | 4/2024 | Hedayat | H04W 74/0866 |

OTHER PUBLICATIONS

"Part 11: Wireless LAN Medium Access Control (MAC) and Physical Layer (PHY) Specifications", IEEE Standards Association, IEEE Computer Society, IEEE Std 802.11-2020, Dec. 3, 2020, 7524 pages.

"10. MAC sublayer functional description (#107)", IEEE P802.11-REVmd/D0.3, Retrieved from the Internet : URL:www.ieee802.org/11/private/Draft_Standards/1lmd/REVmd_Cl_l0.fm.rtf, Sep. 7, 2017, 443 pages.

Yang et al., "Further Improve Latency Performance in 11be", IEEE 802.11-21/0670r0, Retrieved from Internet: URL :https://mentor.ieee.org/802.ll/dcn/21/Il-21-0670-00-00be-further-improve-latency-performance-inllbe.pptx, Apr. 13, 2021, 13 pages.

"Part 11: Wireless LAN Medium Access Control (MAC) and Physical Layer (PHY) Specifications", IEEE Standards Association, IEEE Computer Society, IEEE Std 802.11™-2016, Dec. 7, 2016, pp. 1-3532.

* cited by examiner

COMMUNICATION DEVICES AND METHODS FOR TXOP TRUNCATION

CROSS-REFERENCE TO RELATED APPLICATIONS

The present application is based on PCT filing PCT/EP2022/078262, filed Oct. 11, 2022, which claims priority to European Patent Application No. 21205621.2, filed Oct. 29, 2021, the entire contents of each are incorporated herein by reference.

BACKGROUND

Field of the Disclosure

The present disclosure relates to first, second and third communication devices for communication there between. The present disclosure relates further to corresponding communication methods.

Description of Related Art

WLAN, as defined in IEEE 802.11-2016, implements packet-based data transmission. When one or more input data packets or MSDUs (MAC layer service data unit) are present and the wireless channel is free, these MSDUs are processed by the MAC layer to one or more MPDUs (MAC layer protocol data unit) and by the PHY layer, before they are transmitted to one or more peer WLAN communication device as PPDUs (physical layer protocol data unit).

Certain restrictions apply to the length of such a PPDU, measured on the wireless channel. These restrictions limit the maximum length or transmit time to a range from 2 ms to 10 ms (sometimes 20 ms) depending on the considered standard. The transmit time is determined and fixed at the beginning of a PPDU transmission. A long transmit time is favorable for high efficiency in communications as the overhead for gaining channel access, preamble transmission, and/or control frame transmission gets negligible.

In the context of low-latency communications, an access point (AP) or a station (STA) may want to transmit both non-latency sensitive and latency sensitive data packets. Often, the arrival of a latency sensitive packet is random, unknown, and unpredictable. Thus, it may happen that a transmission of one or more non-latency sensitive MSDUs has just started when one or more latency sensitive MSDUs arrive. According to the current WLAN behavior, the ongoing PPDU transmission is required to finish before a new PPDU transmission that conveys the latency sensitive MSDUs can be initiated. Thus, the latency sensitive MSDUs may need to wait unacceptably long for their transmission.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and methods that allow a low latency sensitive traffic exchange. It is a further object to provide a corresponding computer program for implementing a communication method and a non-transitory computer-readable recording medium for implementing a communication method.

According to an aspect there is provided a first communication device configured to communicate with a second communication device and a third communication device, the first communication device comprising circuitry configured to perform exchange of data units with the second communication device during a current transmit opportunity, receive, before or during the current transmit opportunity, a truncation notification indicating that the ongoing exchange of data units should be suspended and that a preemptive data unit may be received from and/or transmitted to the third communication device, suspend the ongoing exchange of data units with the second communication device before the end of the transmit opportunity, and receive from and/or transmit to the third communication device the preemptive data unit within the remaining duration of the transmit opportunity.

According to another aspect there is provided a second communication device configured to communicate with a first communication device and a third communication device, the second communication device comprising circuitry configured to perform exchange of data units with the first communication device during a current transmit opportunity, receive, before or during the current transmit opportunity, a truncation notification indicating that the ongoing exchange of data units should be suspended and that a preemptive data unit may be exchanged between the first and the third communication device, and suspend the ongoing exchange of data units with the first communication device before the end of the transmit opportunity.

According to a further aspect there is provided a third communication device configured to communicate with a first communication device, the third communication device comprising circuitry configured to receive, before or during a current transmit opportunity during which exchange of data units is performed between the first communication device and the second communication device, a truncation notification indicating that the ongoing exchange of data units should be suspended and that a preemptive data unit may be received from and/or transmitted to the first communication device, and receive from and/or transmit to the first communication device a preemptive data unit within the remaining duration of the transmit opportunity.

According to still further aspects corresponding first and second communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is the concept of structuring (in particular enabling suspension) an ongoing data exchange and/or a current transmit opportunity (TXOP) used for exchange of non-latency sensitive traffic to serve STAs with latency constraints. A further aspect deals with enhancements to enable correct behavior at the STA, which requires the latency sensitive data exchange, and the STA taking part in the current TXOP but having to suspend is data exchange due to enable the preemptive latency sensitive data exchange. A still further aspect of the present disclosure deals in an improved manner and with correct behavior with determining parameters related to channel access and accessing the channel in situations where an ongoing data exchange is suspended (e.g. truncated or interrupted) in order to allow a low latency sensitive traffic exchange.

In the context of the present disclosure, the first communication device is also called "access point" or "AP", the second communication device is also called "starting station" or "sSTA" and the third communication device is also called "preemptive station" or "pSTA". The terminology that a preemptive data unit "may be received or transmitted" shall be understood such that a preemptive data unit is expected or planned to be received or transmitted, but such a reception or transmission of a preemptive data unit may, in fact, not happen due to circumstances.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
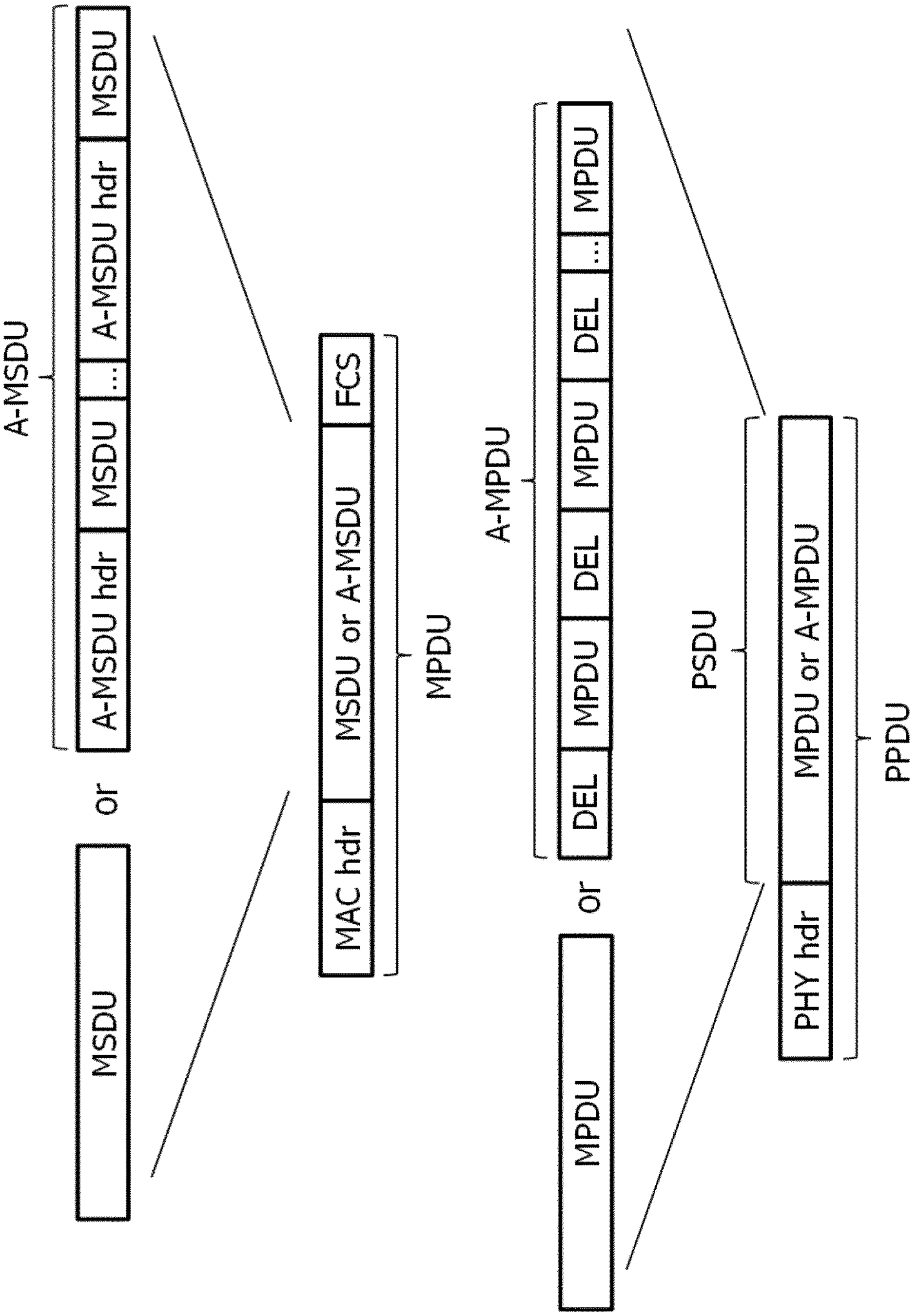
FIG. 1 shows a diagram illustrating the relation and construction of data units in conventional WLAN.

Referring now to the drawings, wherein like reference numerals designate identical or corresponding parts throughout the several views, FIG. 1 shows the generally known relation and construction of data units in WLAN, in particular of MSDUs or A-MSDUs (aggregated MSDUs), MPDUs, PSDUs (physical layer service data units) and PPDUs.

According to the present disclosure a PPDU transmission, i.e. a transmission of a data unit, shall be truncated (or interrupted) without losing data that has already been transmitted. It can thus be considered as a receiver friendly truncation of an ongoing PPDU transmission.

Figure 2:
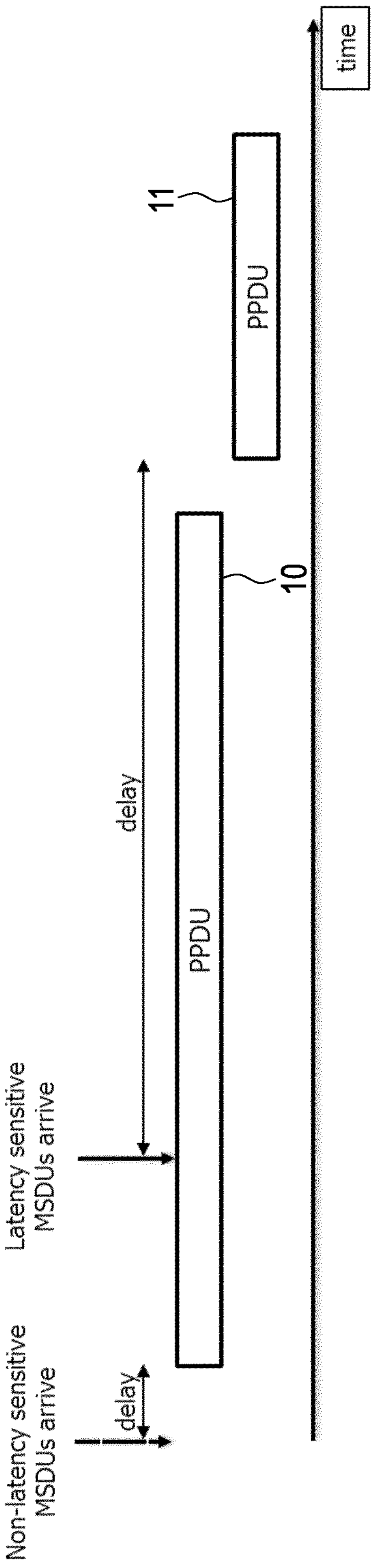
FIG. 2 shows a diagram illustrating non-latency and latency sensitive data transmission without PPDU truncation.
Figure 3:
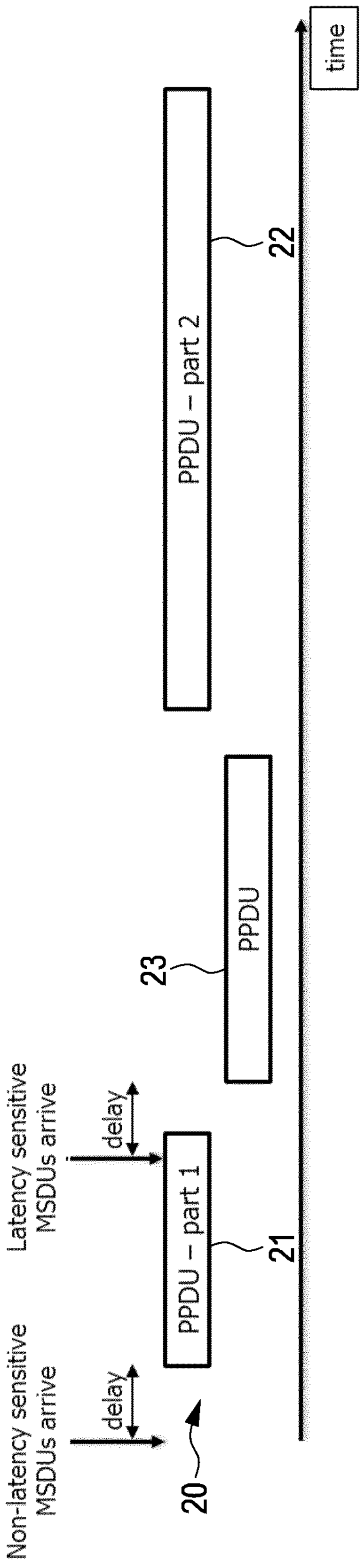
FIG. 3 shows a diagram illustrating non-latency and latency sensitive data transmission with PPDU truncation.

FIGS. 2 and 3 show diagrams illustrating the benefit of PPDU truncation with respect to low latency communications. According to FIG. 2 PPDU truncation is not used; according to FIG. 3 PPDU truncation is used. It shall be noted that both figures illustrate the conventional WLAN behavior and that the MSDU arrival times are equal in both figures.

According to FIG. 2, the PPDU 10 holding the non-latency sensitive MSDUs is required to be finished before the latency sensitive MSDUs held in the PPDU 11 can be transmitted. This causes an unwanted queuing delay for the latency sensitive MSDUs because the latency sensitive MSDUs need to be buffered in a queue or memory until they can be transmitted. According to FIG. 3, however, the truncation of the PPDU 20 holding non-latency sensitive data into two PPDU parts 21 and 22 allows for a speedy transmission of the PPDU 23 holding the latency sensitive data. Thus, the queuing delay of the latency sensitive MSDUs is smaller compared to FIG. 2. The queuing delay of the non-latency sensitive data increases in FIG. 3 compared to FIG. 2 PPDU truncation can provide a trade-off of queuing delay of different traffic types but not a reduction. It should be noted that non-latency sensitive and latency-sensitive MSDUs may target different STAs.

Within WLAN PHY and MAC layer signal processing may in an embodiment be done block-wise. Several processing steps have different block lengths. The block lengths that may be respected for the envisioned PPDU truncation operation are LDPC code word length, OFDM symbol length, and MPDU data unit.

The MPDU data unit consists of (i) header information, (ii) (encrypted) user data, often MSDU, and (iii) frame check sequence (FCS). The FCS is used to detect transmission errors within the user data and/or header information. In case an error is detected, the MPDU is discarded and a retransmission may be requested from the transmitter of that MPDU. One or more MPDUs may be aggregated to an A-MPDU for transmission in a single PPDU (FIG. 1). Once the PSDU, i.e. MPDU or A-MPDU, is readily available in the MAC layer, i.e. at least the amount of data to be transmitted is known, the PHY layer is triggered for transmission.

In the context of real time application (RTA), an AP needs to service STAs within its basic service set (BSS) that have stringent constraints in point of latency and jitter. On the other hand, PPDUs defined currently in WLAN can have relatively long transmission times e.g., up to 5 ms. In order to ensure timely delivery of latency and jitter sensitive traffic, a preemption concept may be used. This envisions that a non-latency transmission is interrupted in order to allow another low latency (LL) transmission to be performed. A preemption could be performed at PPDU level, i.e., a PPDU transmission is prematurely terminated (or truncated) and a new PPDU is sent to the STA requiring the LL traffic. A challenge in truncating an actual PPDU is that preambles at both PHY and MAC levels are sent and are fixing the transmission parameters as well as the format of the transmission of the respective PPDU. This makes it difficult and inflexible to adapt to the new required transmission parameters.

Timely delivery of LL traffic may as well be ensured by a form of preemption, which is easier to implement and comprises interrupting/suspending transmit opportunities without actually terminating or truncating the PPDU transmission. This concept is addressed in the present disclosure. Implementation details are described that enable operation in a WLAN environment. One of the ideas of the disclosed concept is that a first STA (or AP) structures its transmit opportunity with a second STA in such a way as to make it possible for a latency sensitive data exchange between a preemptive STA (pSTA; also called third communication device herein) and the first STA (or AP; also called first communication device) and a starting STA (sSTA; also called second communication device herein) to take place before the actual termination of the traffic between the first and second communication devices for which the transmit opportunity was obtained.

Different scenarios that are considered hereinafter are depicted in FIGS. 4 to 13. Various terms used in the present disclosure shall be understood as follows in the context of the present disclosure. The truncation notification shall be understood as one or more the following or may include one or more of the following:

a) It may represent or include a Low Latency Truncation Notification (LLTN), which is a notification that comes from an upper layer of the respective communication device, indicating that LL traffic is queued or requested.

b) It may represent or include an LL truncation indication, which is a signaling within a PPDU that it contains LL traffic or requests transmit time for LL traffic. It is an indication that a high priority data exchange is needed which can suspend the ongoing data exchange between the first and second communication devices. A truncation notification at the AP (first communication device) may be a result of receiving a packet from the third communication device with an LL truncation indication.

c) It may represent or include suspension notification, issued by an upper layer or by a management entity of a communication device, which indicates that one or more waiting time intervals, also called preemptive periods (also called suspension interval) herein, should be inserted within the data exchange between the first and second communication devices. During the preemptive periods, the data exchange between the first and second communication devices is temporarily suspended to allow possible reception or transmission of preemptive data units from/to a third communication device. When the suspension notification is issued at the first communication device to indicate a temporary interruption of DL data units to a second communication device, the suspension notification may instruct (e.g. by a PHY layer) to include a suspend indication (also referred to as PSI herein), e.g. within the PPDU immediately preceding the preemptive period and which may be sent to the second communication device as part of the ongoing data exchange.

Figure 4:
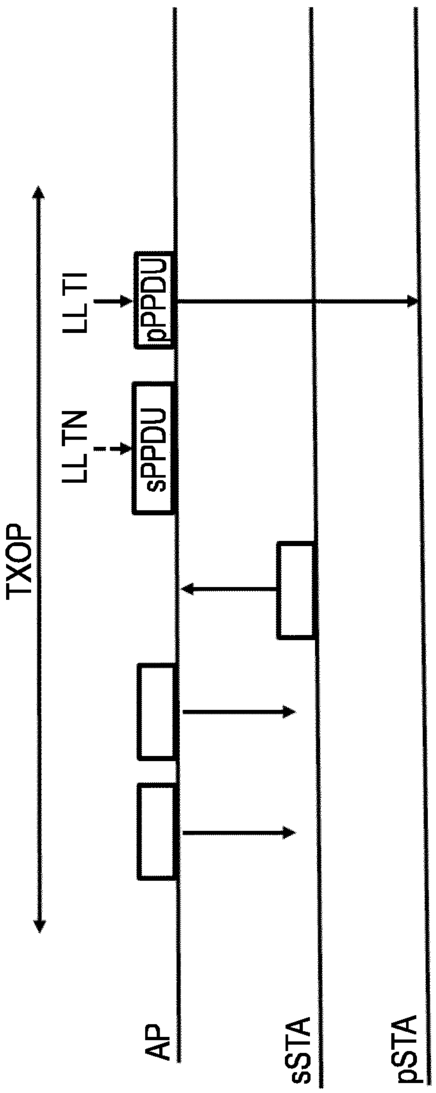
FIG. 4 schematically shows a first embodiment of a first scenario for application of the present disclosure.

FIG. 4 shows a schematic diagram of a first embodiment of a first scenario according to the present disclosure using downlink (DL) inter-PPDU truncation for DL or trigger-based UL preemptive traffic. According to this implementation, an AP and an sSTA are exchanging data within a TXOP obtained by the AP. During the transmission of one of the PPDUs (or, more generally, data units or data frames), denoted as sPPDU, the AP receives an LL Traffic Notification (TN), more generally also called truncation notification, indicating that LL sensitive traffic destined for pSTA is queued. The LLTN may come from higher layer, e.g. a distribution system or a central control entity. After finishing the transmission of the sPPDU, the AP sends a pPPDU at least to pSTA, which may contain a low latency truncation indication (LLTI), signaling that LL traffic towards pSTA follows.

The pPPDU can be as designed as follows:

A single user (SU) PPDU towards pSTA, in case of TXOP truncation for DL preemptive traffic.

An SU PPDU indicating at least the start of the pSTA traffic and optionally a suspension of the sSTA traffic. In case the data exchange with sSTA is interrupted for an uplink (UL) transmission of the pSTA, then pPPDU can be implemented as a trigger frame, which in the user specific field contains information regarding the parameters that should be respected: e.g., transmission should not exceed the TXOP boundary. In this case the indication of suspension of the sSTA is implicit. In case the preempted transmission is DL transmission and the indication regarding the suspension of the sSTA traffic is explicit, the pPPDU can be designed as an SU PPDU, towards both sSTA and pSTA and containing a common field with an indication of the suspended transmission.

Furthermore, in the user specific fields the specific behavior that each of the STAs should follow can be indicated. For example, for the sSTA, the user field should indicate that this STA should not transmit until the end of the pSTA exchange. Furthermore, possible duration of traffic exchange with pSTA may be included or, alternatively a possible continuation indication, e.g., upon expiration of a timer. In this way, sSTA is not required to continuously listen to the medium for the continuation of its transmission, thus giving it a possibility to save power.

A multi user (MU) PPDU towards both sSTA and pSTA, containing a continuation of the DL traffic of sSTA and a traffic from pSTA An end notification (CF-End) temporarily stopping the transmission opportunity established for the AP to sSTA data exchange.

The LL Traffic Notification may be received from upper layers to indicate that there is LL traffic queued for pSTA or received from upper layers to indicate that the pSTA has requested an LL transmission. This request may come from a transmission of a pSTA via a different link (out-of-band signaling) in case the AP is capable of multi-link operation or via the same link by some special processing. One more option for the trigger-based UL preemptive traffic is that the pSTA transmits the LL truncation indication in FDD mode using a wideband bidirectional TXOP.

An enhanced RTS (eRTS) or modified MU RTS can be used to set up the transmit opportunity and indicate within the RU allocation in the user specific fields for pSTA or LL-AID (low latency allocation identifier) group, a subchannel of the operating bandwidth (BW), on which these can respond. AN LL AID group is an allocation ID, identifying one or more stations that are addressed by a specific frame, in this case the eRTS. If during the DL transmission towards the sSTA a pSTA issues an LL traffic notification, then it may transmit on the respective subchannel (following further rules imposed by FDD). In this way the LLTN gets propagated towards the AP, which will then stop the transmission towards the sSTA within the next PPDU after processing the LLTN. The pPPDU may in this case follow the implementation as a trigger for the pSTA and optionally as indication for sSTA of stopped transmission. The assumption is that only some simpler processing can be performed in a first stage on both channels simultaneously, for which reason a truncation of the sSTA traffic with continuation in TDD may be justified.

Figure 5:
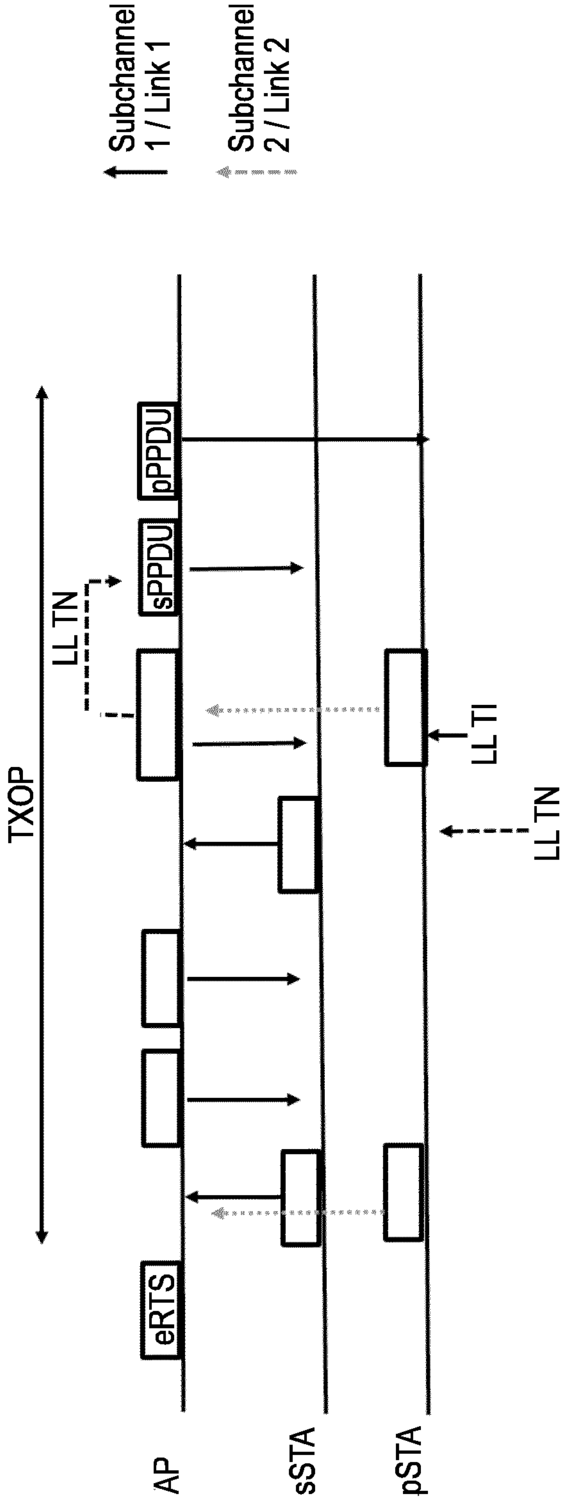
FIG. 5 schematically shows a second embodiment of the first scenario for application of the present disclosure.

This is depicted in FIG. 5 showing a schematic diagram of a second embodiment of a first scenario according to the present disclosure according to which the LLTN is obtained from a different band or subchannel. Here, eRTS stands for enhanced RTS and has the role of indicating if and which two links or subchannels can be simultaneously used one for DL and the other for UL and aiming to reserve a subchannel or link for a potential transmission of latency sensitive traffic. If the sPPDU, during the transmission of which the LLTN was issued, contains data frames requesting an immediate acknowledgement (Ack), then the pPPDU may only be sent at the earliest within SIFS after the reception of the Ack, and assuming that there is enough time within the remaining TXOP.

Figure 6:
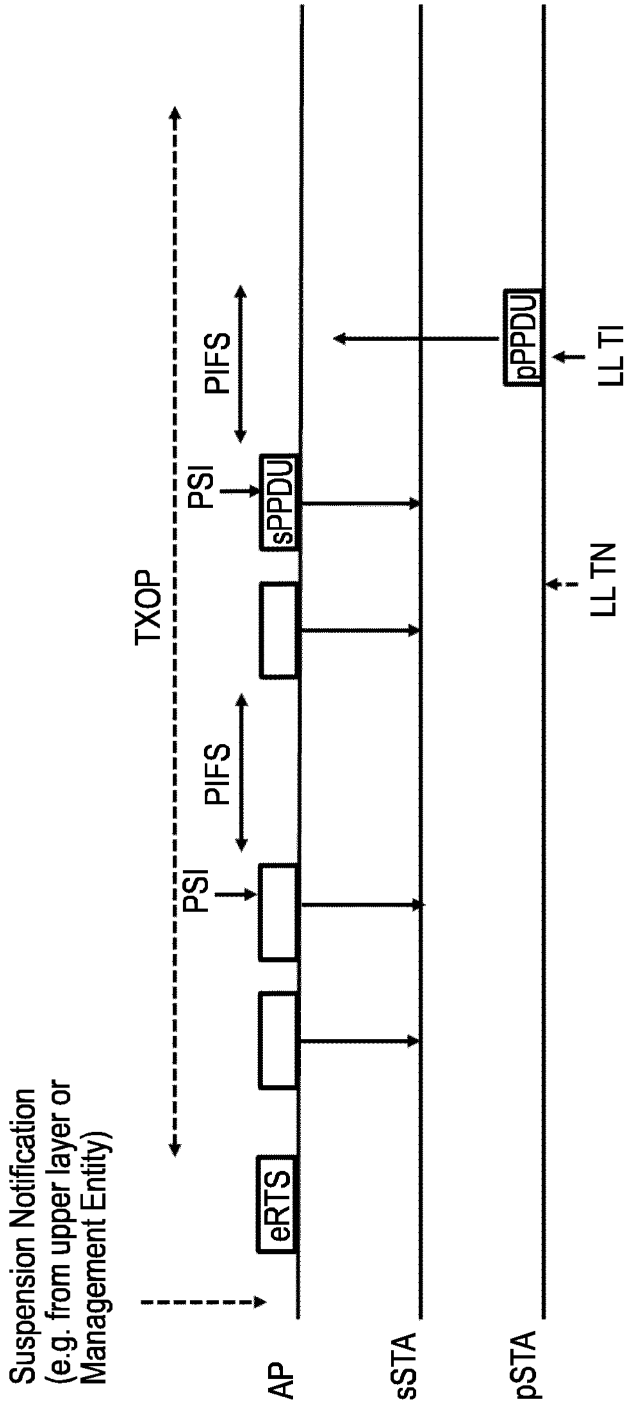
FIG. 6 schematically shows an embodiment of a second scenario for application of the present disclosure.

The LL traffic may not need to originate from the AP towards a pSTA. The case of pSTA having stringent UL traffic to transmit is also of interest and an approach to deal with this case is shown FIG. 6 depicting a schematic diagram of an embodiment of a second scenario using DL inter-PPDU truncation for UL preemptive traffic. In this case the AP structures the TXOP such that one or more PPDUs transmitted towards an sSTA are followed by a waiting time of e.g. PIFS (priority interframe space). Within this interval, a pSTA may initiate a transmission towards the AP, containing an LL truncation indication. If a pPPDU is received by the AP, then the data exchange towards the sSTA is temporarily suspended and the data exchange with pSTA is started. If no PPDU is received by the AP during the PIFS, then the data exchange with the sSTA is continued.

An AP may receive information before the TXOP from a pSTA, regarding the traffic characteristics, e.g. periodicity of low latency transmission that may require a truncation. Based on this, an upper layer or management entity residing within the AP issues an indication, which is referred to as suspension notification. Upon reception of this, an AP structures a TXOP with waiting time intervals, which may allow the pSTA to interrupt an ongoing data exchange between the AP and a different STA.

The PPDUs immediately preceding a waiting interval may contain an indication e.g., within their preambles and depicted as PSI (partial suspension indication; herein also referred to as suspend indication or as PSI flag). Alternatively, such a suspend indication may be transmitted separately. Only upon reception of this indication, a pSTA may attempt to access the channel. At the same time, sSTAs should not access before the waiting time expires, if they received such a suspend indication, e.g. as part of a PPDU or as separate indication). A PPDU immediately preceding a waiting time should also not carry frames which require an immediate acknowledgement or an immediate response from the sSTA, as in this case collisions between sSTAs and pSTAs may occur.

From pSTA perspective, its upper layers issue an LLTN during the TXOP between the AP and sSTA. The pSTA waits for a PPDU with a PSI indication, announcing that a waiting interval of e.g. PiFS follows, and accesses the channel to transmit a pPPDU towards the AP. For this scheme to work, the pSTA can start a transmission during the current TXOP obtained by the AP. This can be ensured by one of the following approaches.

If the AP knows before obtaining a TXOP that an LL transmission may be needed to be performed (this information may be known in advance by indication from the pSTA or by establishing an active LL TS session with the pSTA), then the TXOP may be obtained to accommodate both kinds of traffic: e.g., with MU RTS for sSTA and pSTA or with an enhanced RTS-type frame. If the AP does not know beforehand the exact pSTA (sometimes also referred to as LL STA, i.e., STA having low latency traffic), which may require the high priority traffic during the current TXOP, then it may indicate within the user specific field of the MU RTS or enhanced RTS a group AID defined for a set of pSTAs. A STA within this set, which issues an LLTN during the TXOP may act as a pSTA and request a high priority transmission within the waiting intervals. Additional information may be included within the MU RTS or enhanced RTS such as the fact that the current TXOP may be truncatable, if waiting times are included, bandwidth indication on which a pSTA may transmit a packet with LL traffic indication, and/or subchannel indication on which a pSTA may transmit a packet with LL indication during a DL transmission of the AP towards the sSTA. This information is useful to assist the pSTA in enabling an sSTA to transmit LL truncation indication.

To ensure that fast transitions are possible for traffic of different category (e.g., transitions between a low priority traffic and LL traffic) the transmission within the TXOP may be performed as succession of short PPDUs with short or no IFS between them rather than a traditional transmission of PPDUs followed by Acks. Acknowledgements of the data units contained in the PPDU may occur upon request after a succession of PPDUs, depending on the MAC requirements.

To ensure fast transitions between the PPDUs, these may contain, e.g. within a postamble, an indication of the following PPDU. This may be a simple 1 or 2 bit indication that indicates if the transmission is continued within the next PPDU or not or if transmission parameters will be changed within the next PPDU. In this way an sSTA can receive an indication within the sPPDU that its transmission will be truncated after the end of the sPPDU or a transmission may continue as MU PPDU.

Figure 7:
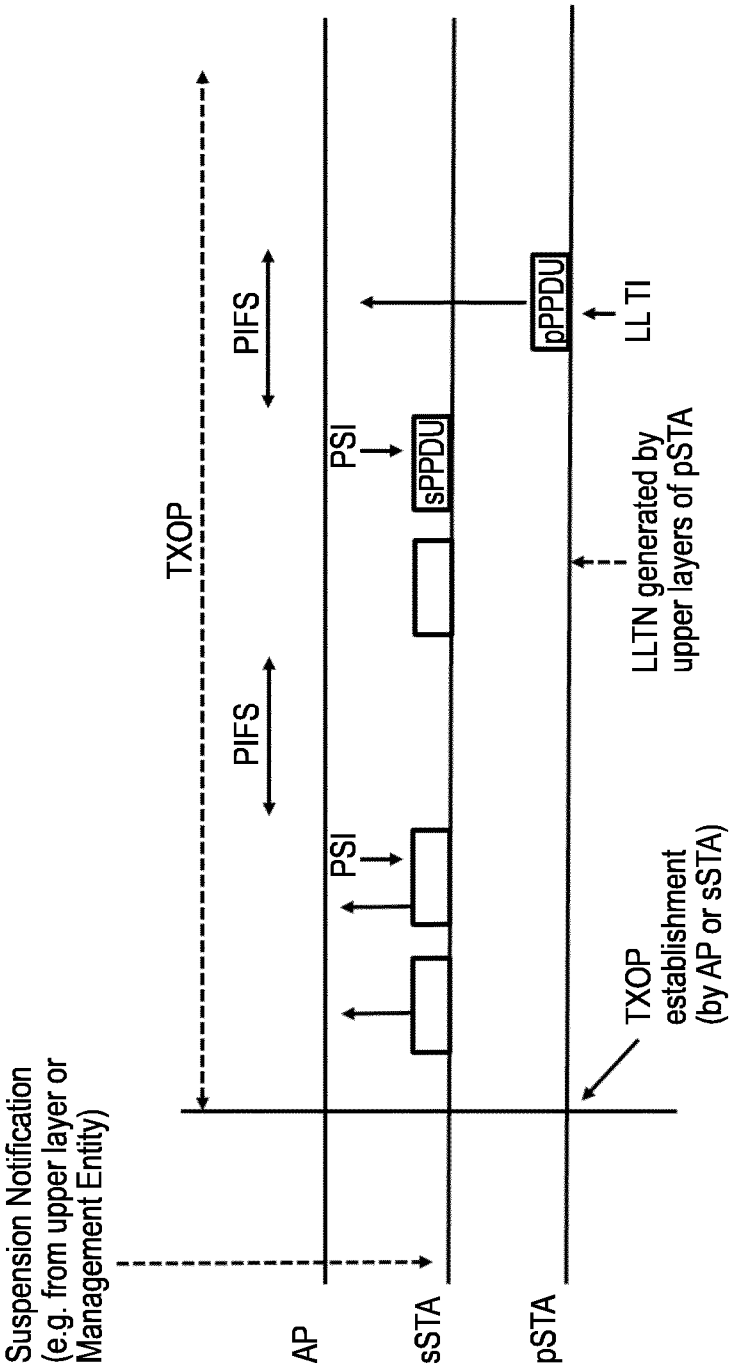
FIG. 7 schematically shows an embodiment of a third scenario for application of the present disclosure.

The embodiments of the first and second scenarios focused on the case in which the AP was the one performing the truncation of the transmission. However, this does not need to be the case. FIG. 7 shows a schematic diagram of an embodiment of a third scenario according to the present disclosure using UL inter-PPDU truncation for UL traffic. In this case, the sSTA is the one that has obtained the TXOP and structures it in a similar way as in the second scenario, as succession of PPDUs, followed by a waiting time. A pSTA, which received an LLTN, waits for the first PPDU containing a PSI (or a separate transmission of a suspend indication) and within SIFS sends a pPPDU towards the AP.

A potential challenge in this case is that the sSTA and pSTA may be hidden from each other, meaning that either pSTA may not hear the PPDUs containing the PSI indication or the sSTA may not hear the pPPDU sent by the pSTA. The former problem may result in an inefficient use of spectrum, whereas the latter may result in potential collisions as both STAs may start transmitting at the same time. Therefore, an AP should ensure that an sSTA starts a TXOP structured in this manner, if there exists a high probability that the sSTA is heard by at least one LL STA, which has an active LL TS, with traffic periodicity that may require a high priority transmission during the TXOP. Furthermore, a pSTA may not access within the waiting time, if it may be a hidden node to sSTA, and the waiting interval is not sufficient to complete a pPPDU transmission. A potential solution against the hidden node problem will be explained below.

In order to structure a TXOP in the proposed way, the sSTA may have some incentive. Therefore, sSTAs that are willing to follow this behavior may be allowed to request longer TXOPs than the traditional TXOPs. The new limits may be announced by the AP, e.g. inside a beacon or within a setup phase, as will be elaborated further. An sSTA requiring a longer TXOP but not respecting the waiting times may be penalized by the AP, either by stopping the TXOP, e.g. by extending a CF-End functionality for this case, or by not granting future TXOPs for a specified time interval.

Structuring TXOPs in the manner shown in FIGS. 6 and 7, may be more inefficient than the regular operation, especially if the probability of LL sensitive traffic is low. Therefore, a solution to allow an efficient implementation of the special TXOPs, which avoids the hidden node problem, indicates the allowed TXOP structures and avoids the waiting times when no interruptions from low latency traffic are expected, is to allow these special structure TXOPs to only be requested during specific time intervals, for example by reutilizing the broadcast TWT framework.

In essence, the AP defines scheduled time intervals, to which the sSTAs and pSTAs are members, and indicates the transmission conditions during these intervals. Additional information that may be defined to ensure the operations described herein may include one or more of:

- a suspension notification, indicating that a STA requesting a TXOP within a specific scheduled interval may or should include waiting times intervals within the data exchange;
- if within broadcast TWT LL traffic interruptions are allowed;
- the TXOP limits that can be requested for special TXOP;
- a maximum transmission time in between waiting intervals, which may be set according to the traffic characteristics indicated by the one ore LL STAs which would act as pSTAs during the TWT;
- a set of AIDs for low latency traffic STAs, which are allowed to access the channel during the waiting intervals; and
- whether the sSTAs are allowed to request special TXOPs i.e., TXOPs with longer duration and/or waiting intervals.

The specific time intervals may be set according to traffic periodicity indicated by pSTAs, during an LL session setup. Linking the preemptive intervals to broadcast TWT is additionally beneficial for pSTAs, which do not need to monitor each TXOP for a chance to transmit but only the ones during the predefined intervals, thus enabling a more efficient power saving.

TXOPs requested with longer durations and during specific TWTs, allowing inter-PPDU truncations, may be implicitly interpreted as shared TXOPs, in which a pSTA from the defined set is allowed to transmit, as long as it follows the rules of the special TXOP, the TXOP boundaries, and the traffic ID for which the transmission is requested corresponds to low latency traffic. Alternatively, the indication of a shared TXOP with the properties mentioned above can be explicitly defined within fields of a modified RTS type frame.

For the second and third scenarios described above the following shall be noted. If more than one STA is announced that can act as a pSTA, then contention can be used by the STAs to gain access to the channel. In this case, pSTAs desiring to transmit, upon reception of a PPDU with PSI, start listening to the channel and if idle decrement their Backoff (BO) counter. When the BO Counter reaches 0, after a PPDU with PSI indication, then these pSTAs are allowed to access the channel. The transmission parameters (e.g. Enhanced Distributed Channel Access (EDCA) parameters) may be revisited and announced specifically for this operation, given the latency requirements and the number of potential pSTAs that are allowed to contend during a specific interval. For such operation an interval longer than PIFS may be necessary though.

Figure 8:
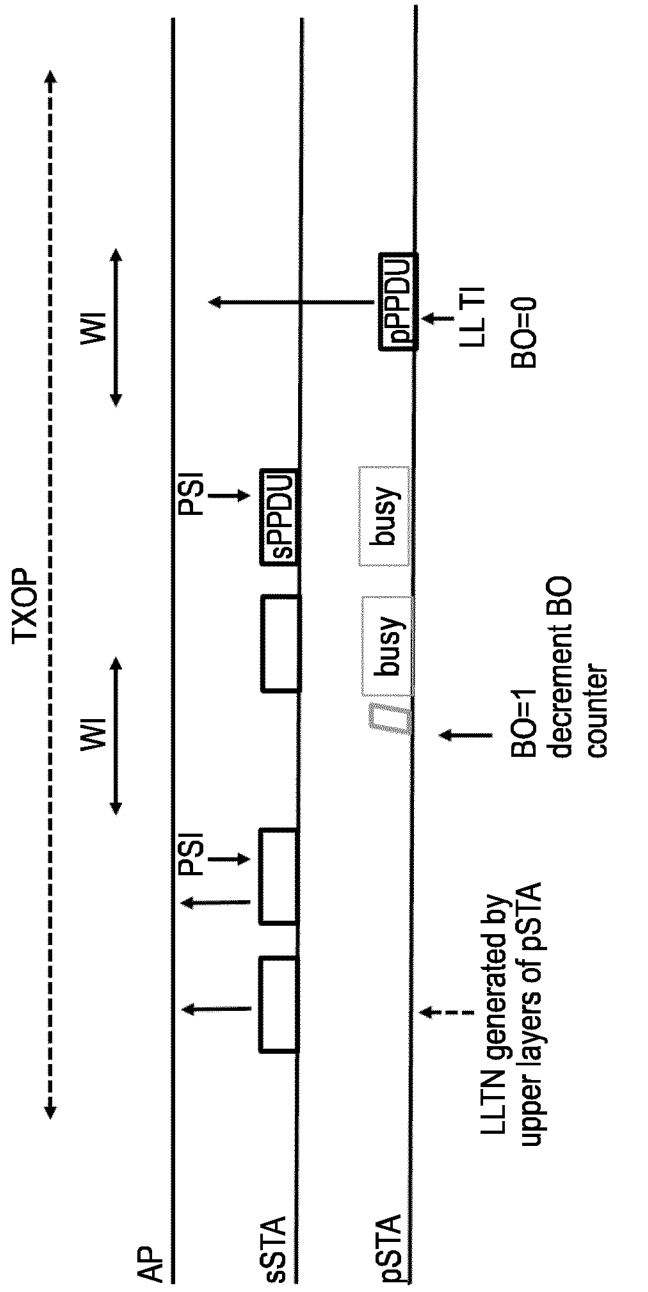
FIG. 8 shows a schematic diagram of another embodiment of the second and third scenario for application of the present disclosure.

This behavior is illustrated in FIG. 8 showing a schematic diagram of another embodiment of the second and third scenario according to the present disclosure using UL inter-PPDU truncation for UL traffic with contention. In FIG. 8 WI denotes the waiting interval. As can be seen, in this case pSTA needs to wait after issuing the LLTN not only for a PPDU with a PSI indication but also for the BO to reach 0, in order to access the channel.

Figure 9:
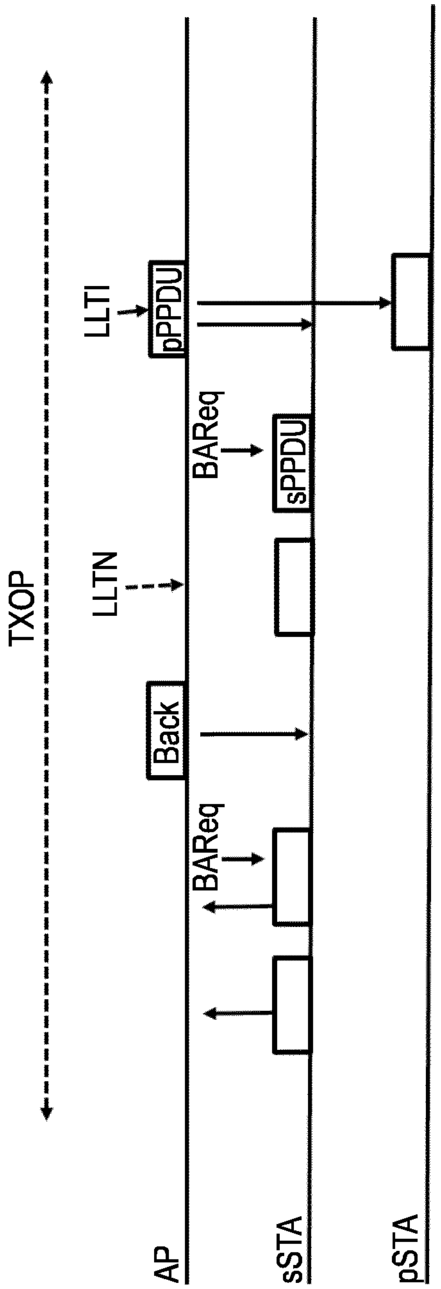
FIG. 9 shows a schematic diagram of another embodiment of the second and third scenario for application of the present disclosure.

FIG. 9 shows a schematic diagram of another embodiment of the second and third scenario according to the present disclosure using UL inter-PPDU truncation for DL preempted traffic or trigger-based uplink. In case the UL data transmission of sSTA would need to be temporarily paused for DL transmission of the preempted traffic, then a scheme without the waiting intervals may be envisioned. In this case, the AP may transmit the suspension indication together with responses to frames requesting acknowledgement. In this case, the PSI is not needed. If an LLTN is issued at the AP, requesting it to start a LL DL transmission towards pSTA or trigger an LL UL transmission from the pSTA, the AP waits for the first sPPDU from the sSTA containing a BAck request. It then responds with a pPPDU, which contains both a response to the sSTA with the requested information and DL or trigger information for the pSTA.

Figure 10:
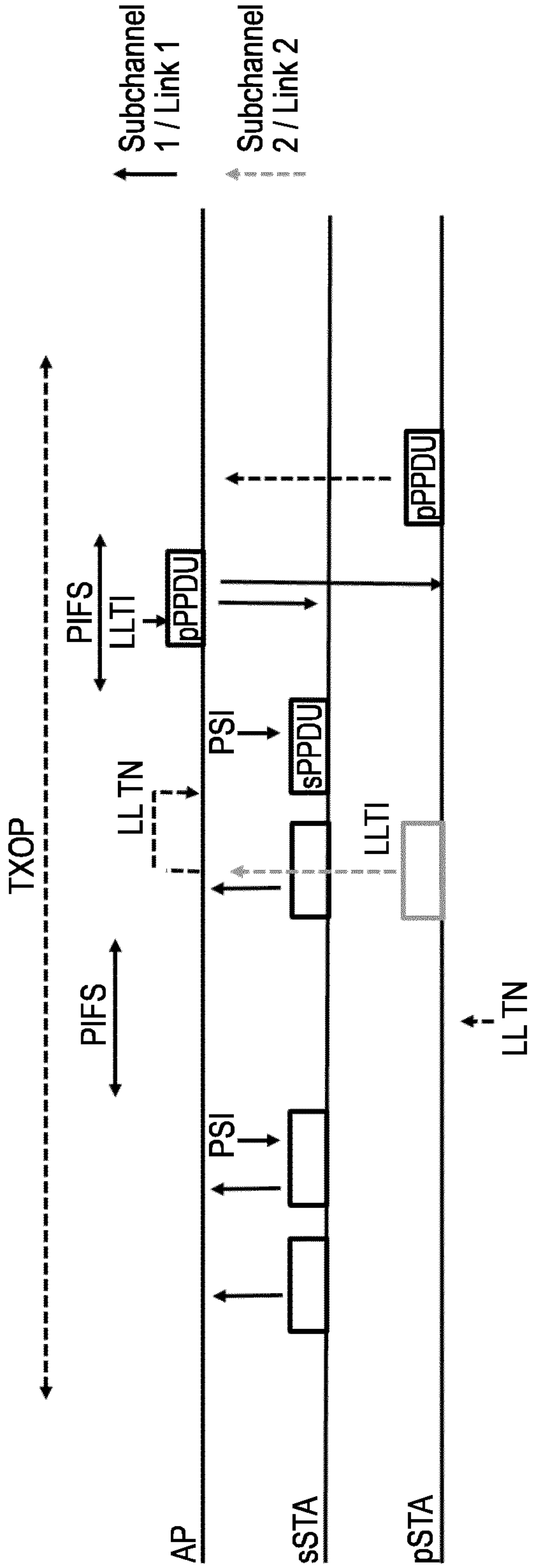
FIG. 10 shows a schematic diagram of a first embodiment of a fourth scenario for application of the present disclosure.

FIG. 10 shows a schematic diagram of a first embodiment of a fourth scenario according to the present disclosure using UL inter-PPDU truncation for UL or DL preemptive traffic with AP involvement. This embodiment avoids the hidden node problem of the embodiments of the second and third scenarios illustrated in FIGS. 8 and 9. In this embodiment, the assumption is that the AP is able to process a simultaneous transmission of the pSTA, for example on another link than the one used by the sSTA to the AP, by means of multilink operation, or on another subchannel by means of e.g. subchannel selective transmission.

During the TXOP of sSTA a truncation notification in the form of an LLTN is generated by the upper layers of the pSTA. Subsequently, the pSTA forms a packet with an LLTI towards the AP and sends it to the AP, respecting the channel access rules of the specific link or special conditions imposed by the AP. The LLTI reaches the AP and the upper layers issue a second LLTN, this time at AP side, indicating that the data exchange with the sSTA should be suspended.

Consequently, the AP waits for the first PPDU with a PSI indication from the sSTA (or a separately transmitted PSI indication). Upon reception, within SIFS, the AP sends a pPPDU towards at least pSTA or both pSTA and sSTA. The type of pPPDU to be used is similar to the one discussed for above for the first scenario.

Given that in this case it is the AP sending the pPPDU during the waiting time, the sSTA should with high probability receive this packet also and infer that its data exchange has been temporarily suspended. Therefore, it should refrain from sending further PPDUs towards the AP, until further notification from the AP or until a timer as indicated within the PPDU expires.

Figure 11:
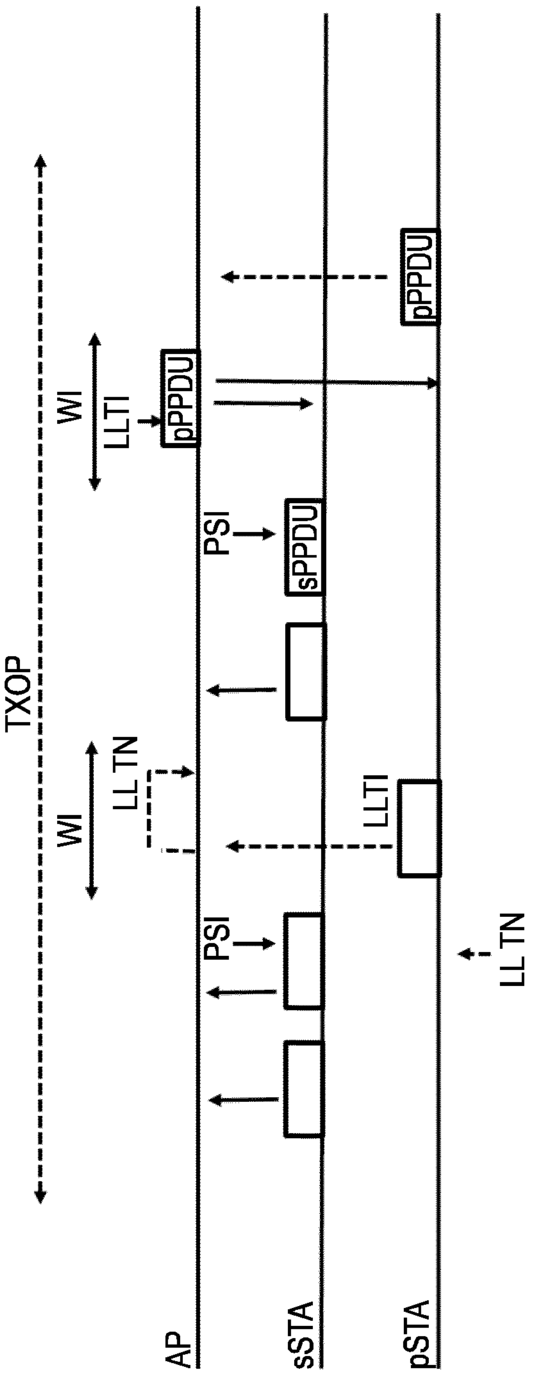
FIG. 11 shows a schematic diagram of a second embodiment of the fourth scenario for application of the present disclosure.

FIG. 11 shows a schematic diagram of a second embodiment of the fourth scenario according to the present disclosure using UL inter-PPDU truncation for UL or DL preemptive traffic with short pPPDU. This embodiment provides a simpler way to avoid the hidden node problem of the embodiments of the second and third scenarios illustrated in FIGS. 8 and 9. This embodiment may, however, be less efficient in terms of spectrum utilization. In this case, the pSTA is allowed to send during the waiting interval a short pPPDU, whose transmission is smaller than the difference between the duration of the waiting interval and the applicable interframe spacings. In this case, even if an sSTA fails to receive the packet containing the LLTI and continues transmitting, no collision will occur. The AP will then use the LLTI indication within the pPPDU and will stop the data exchange with the sSTA after the reception of the next sPPDU containing a PSI indication. The pPPDU can be a packet containing for example only the essential parts such as legacy preamble and SIG fields, with the LLTI indication being a flag set within the SIG field. The waiting intervals in this case may be defined larger than PIFS and the AP should announce the duration of these waiting intervals, e.g. at the TXOP establishment or during a scheduling interval setup.

Similar to the previous scenario, the special TXOPs can be defined within target wake time (TWT) intervals where the allowed parameters of the special TXOP are announced or negotiated. These parameters are similar to the ones defined for scenario 3, with the following addition. For the operation described in FIG. 10 an indication that the AP can process the frame sent by the sSTA on a first a set of links or channels or subchannels of a channel, simultaneously with the reception of a frame from a pSTA on a second set of links or channels or subchannels of a channel. Furthermore, the set of links over which this operation is allowed should also be indicated.

An alternative implementation for setting up the special TXOPs may be as follows. The UL transmissions of the sSTAs are happening within a shared TXOP context started by the AP. In this case, the UL transmission is started by an MU-RTS trigger by the AP, where the additional indication includes the required parameters, such as one or more of truncatable TXOP, waiting time duration and periodicity, set of LL STAs which may truncate the transmission, subchannels within which the pSTA may send a low latency truncation indication, requesting to start a low latency transmission.

Figure 12:
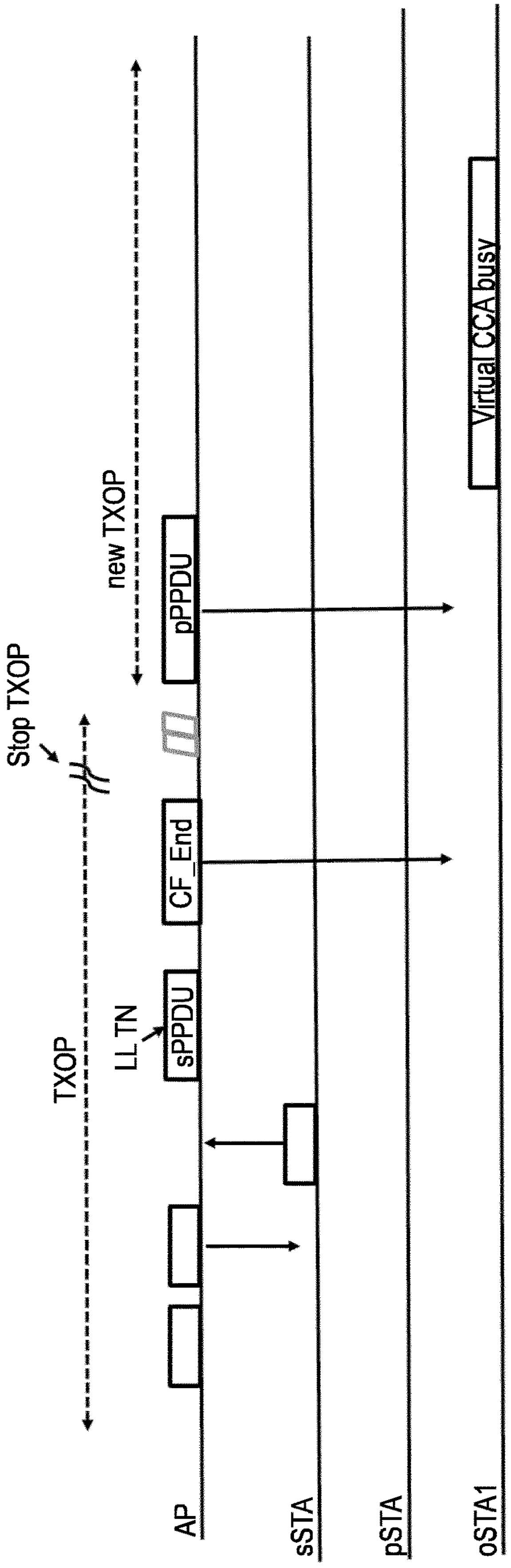
FIG. 12 shows a schematic diagram of an embodiment of an operation for application of the present disclosure with CF-End when AP is TXOP owner.

As mentioned in the description of the first scenario, the first pPPDU after an sPPDU can be a CF-End stopping the existing transmit opportunity prematurely, upon the indication of existing LL traffic. In this case, the AP contends for channel access and obtains a new transmit opportunity for the LL traffic or a shared TXOP, accommodating the two types of traffic for the pSTA and sSTA. FIG. 12 shows a schematic diagram of a first embodiment of an operation according to the present disclosure with CF-End when AP is TXOP owner. The advantages of this embodiment includes that it is easier to understand by legacy STAs and provides more flexibility for the LL traffic. For instance, the transmission is no longer upper bounded by the end of the existing transmit opportunity as in the case of the first to fourth scenarios.

Figure 13:
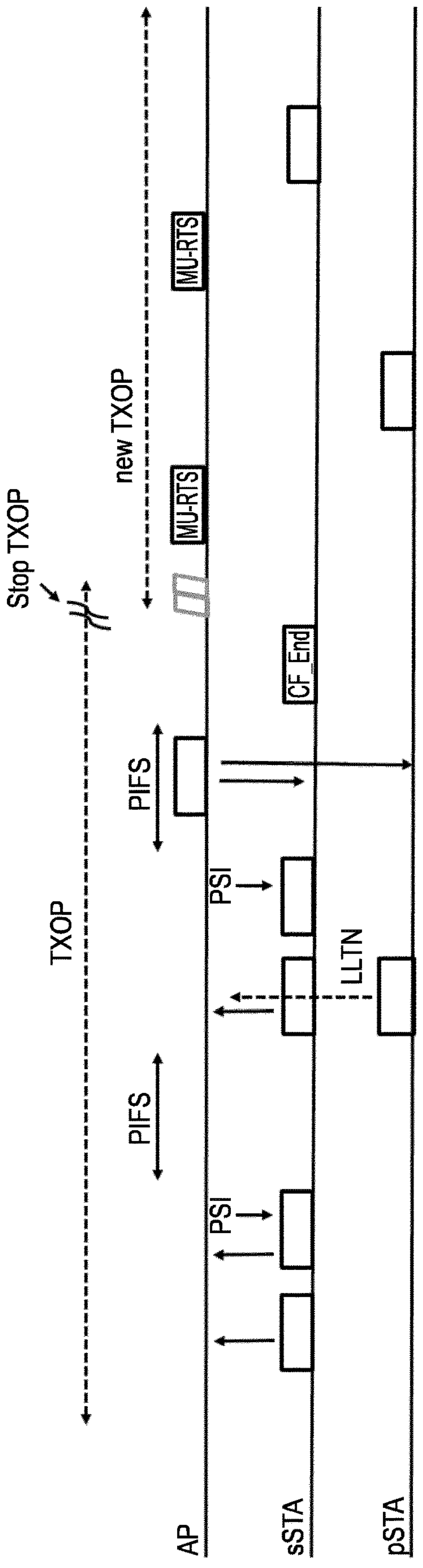
FIG. 13 shows a schematic diagram of an embodiment of an operation for application of the present disclosure with CF-End when sSTA is TXOP owner.

For the cases in which the sSTA is the TXOP owner, the AP may request the sSTA to send a CF-End to terminate its TXOP prematurely, within a pPPDU transmitted during a waiting time. FIG. 13 shows a schematic diagram of a second embodiment of an operation according to the present disclosure with CF-End when sSTA is TXOP owner. Similar to the case illustrated in FIG. 12, the AP will then contend and start a TXOP to accommodate the pSTA traffic or a shared TXOP to allow both data exchanges of pSTA followed by a continuation for sSTA. The request to end the current TXOP can be indicated within a PPDU with a truncation notification in form of an LLTI. In FIG. 13, this PPDU is the one immediately following a PPDU with PSI indication and immediately preceding the CF-End frame.

In order to ensure a correct behavior for the scenarios depicted in FIGS. 4 to 13, pSTA Channel Access, AP Channel Access and Ack Behavior of sSTA should be ensured.

pSTA Channel Access refers to mechanisms enabling the pSTA to access the channel in order to transmit a preemptive data unit or a response to a preemptive data unit e.g., an Acknowledgement. Within a WLAN environment, a common mechanism is based on network allocation vectors (NAV), which hold information of the medium occupancy and are updated periodically based on duration information of frames received from intended or unintended transmitters. When STAs receive a frame, they determine the duration for which the medium is occupied and refrain from accessing the channel or competing for channel access during this interval. Such a behavior may create limitations in case of preemption. This is because once the transmission to an sSTA has started the preemptive STA is seeing the medium busy and is not allowed to transmit during the duration of the data exchange between the AP and the sSTA. Thus, according to the current rules, an sSTA is not able to transmit the preemptive data or a response to a preemptive data until the end of the initially intended transmission opportunity.

AP Channel Access in the context of this proposal refers to several aspects. Firstly, it refers to sharing or truncating transmit opportunities obtained for one sSTA, in case the AP needs to perform a preemptive transmission to a pSTA. Secondly, it refers to distributing correct duration information such that STAs are having similar NAV information, regardless of whether these are hearing the truncated transmissions or not. Finally, it refers to mechanisms performed by the AP in order to facilitate the pSTA channel access. Regarding the first point, a transmit opportunity is obtained for traffic of one specific access category (AC) which becomes the primary access category. There are strong limitations regarding TXOP sharing in the current standards. Regarding the second point, transmitting the pPPDU has to respect transmit opportunity limits in order to avoid creating access problems, i.e., collisions for STAs which have already updated their network allocation vectors, according to the existing rules. However, there are limitations.

TXOP sharing is only allowed under restrictive conditions, a main one being that the duration of the primary AC is not exceeded. In certain environments, e.g. SU, the transmission of the primary AC has to be first completed before sharing the remaining TXOP transmission with another AC, and the particular AC has to have higher priority.

NAV information is updated in all frames based on duration information within the MAC headers as long as such information can be retrieved. Furthermore, a PHY indication of the duration is also available within the preamble for HE STAs, which can be used when the MAC indication cannot be retrieved. Based on information regarding the duration of the following transmit opportunity, STAs determine the medium utilization and next possible transmission times from their side. Thus, the transmit opportunity limits are of importance for STAs correctly deciding on channel access. Consequently, a preemption scheme truncating a TXOP to allow transmission to a different STA should be done such that the two boundaries are consistent with the ones for which the initial PPDU and TXOP duration were advertised.

Ack behavior of sSTA refers to the mechanisms by which the sSTA sends an acknowledgement to the AP, informing whether all the MPDUs sent by the AP have been correctly received and, if not, which MPDUs are missing. There are several mechanisms by which an Ack can be requested or sent. In the particular case of the current proposal special attention should be given to this in order to avoid collisions between the PPDUs carrying Ack frames from the sSTA and the preemptive data transmission. A scheme to avoid this problem according to an embodiment will be explained below with reference to FIGS. 19 and 20.

Figure 14:
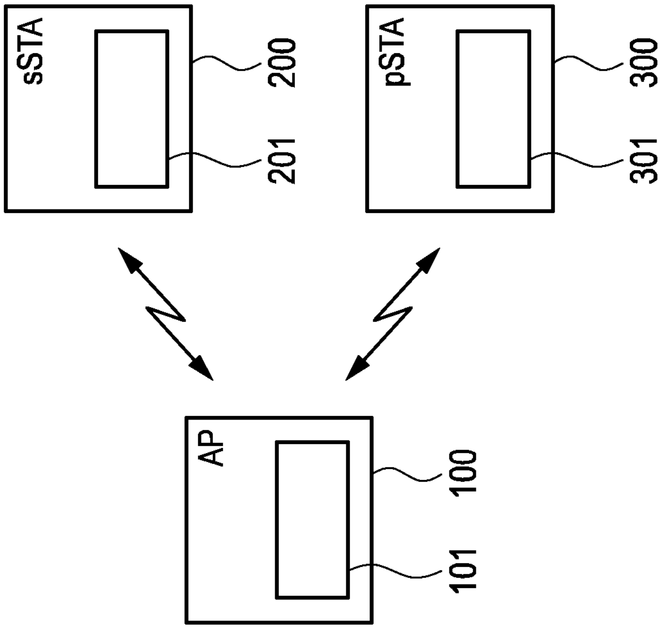
FIG. 14 shows a schematic diagram of communication devices according to the present disclosure.

FIG. 14 shows a diagram illustrating a first communication device 100 (e.g. an access point, AP) according to an aspect of the present disclosure for communicating with a second communication device 200 (herein also called start station, sSTA) and a third communication device 300 (herein also called preemptive station, pSTA) on a wireless channel. The first communication 100 is thus able to exchange (receive and/or transmit) data with the second communication device 200 and the third communication device 300.

Each of the communication devices 100, 200, 300 comprises circuitry 101, 201, 301 configured to perform particular operations. The circuitries may be implemented by a respective processor or computer, i.e. as hardware and/or software, or by dedicated units or components. For instance, respectively programmed processors may represent the respective circuitries 101, 201, 301.

Figure 15:
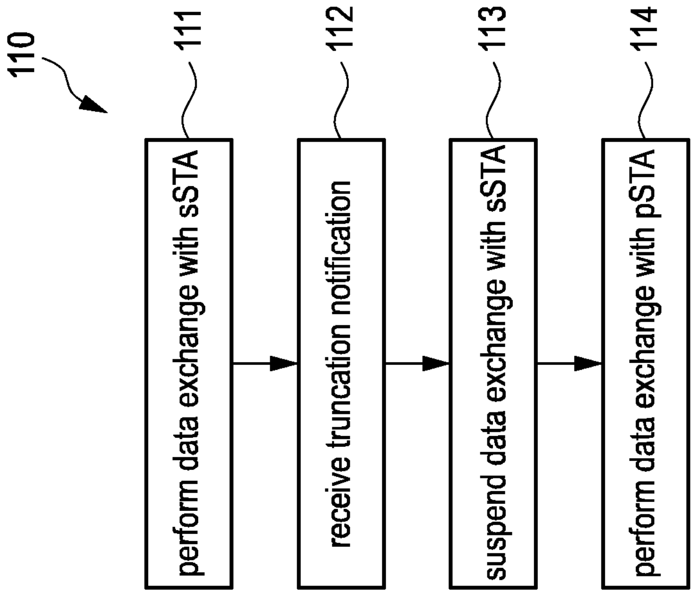
FIG. 15 shows a flow chart of an embodiment of a communication method of the first communication device according to the present disclosure.

FIG. 15 shows a flow chart of an embodiment of a first communication method 110 of the first communication device 100 (the AP) according to the present disclosure, which may be performed of by the circuitry 101. In a first step 111 the AP performs exchange of data units with the second communication device during a current transmit opportunity. The truncation notification may indicate that there is a high priority low latency traffic/traffic with higher priority than contained in the ongoing transmission during the ongoing transmit opportunity. Once a truncation notification is received, it should first be determined if it is possible to perform a truncation (i.e., if it fits within the duration, STA is eligible to process a truncated transmission) and only then decide to truncate the TXOP.

In a second step 112 the AP receives, before or during the current transmit opportunity, a truncation notification indicating that the ongoing exchange of data units should be suspended and that a preemptive data unit may be received from and/or transmitted to the third communication device. In a third step 113 the AP suspends the ongoing exchange of data units with the second communication device before the end of the transmit opportunity. In a fourth step 114 the AP receiving from and/or transmit to the third communication device the preemptive data unit within the remaining duration of the transmit opportunity.

Figure 16:
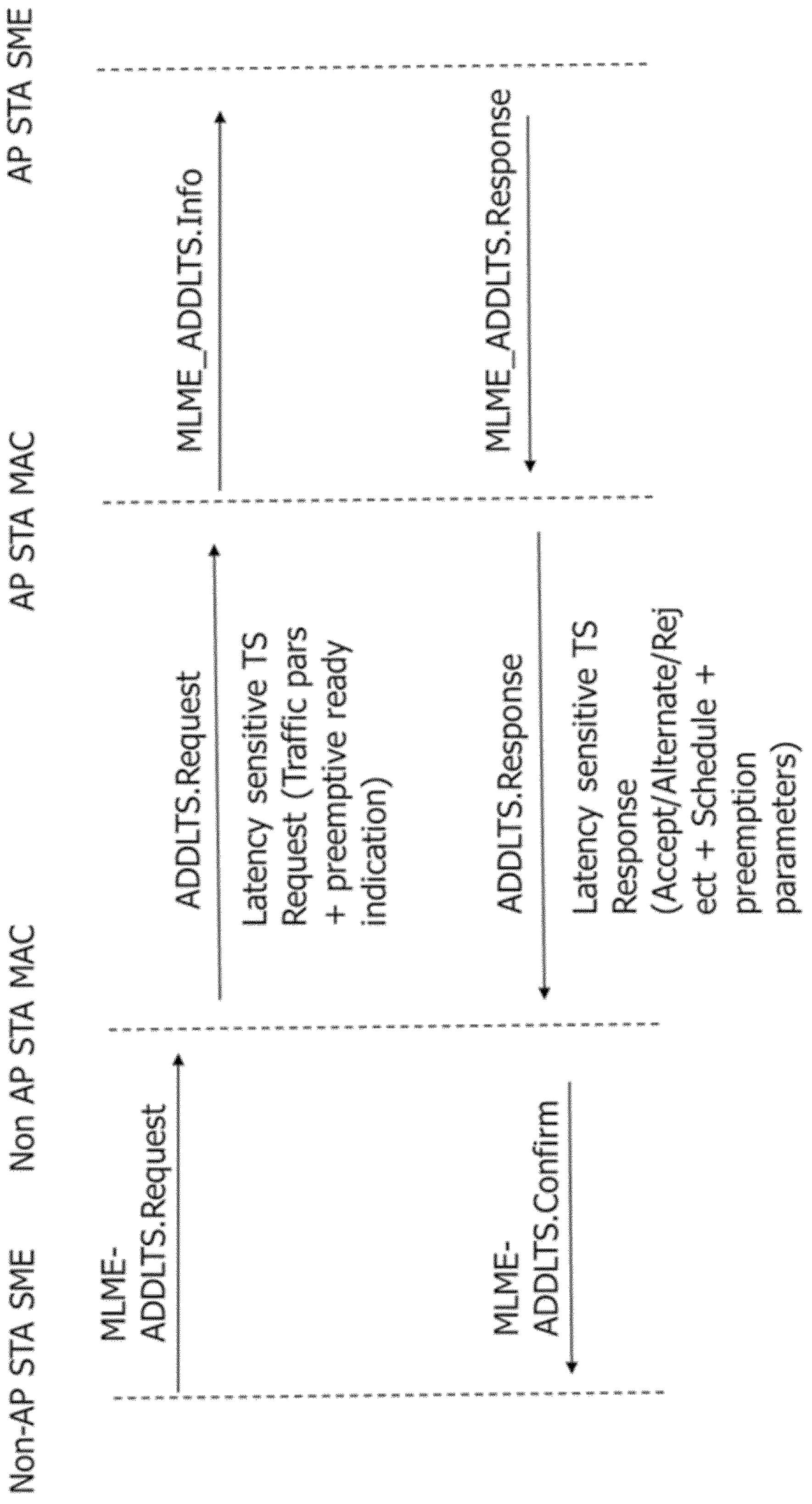
FIG. 16 shows a diagram illustrating the operation of a session in which a non-AP station initiates a low latency traffic session.

Another embodiment deals with establishing low latency sensitive traffic stream (LLTS) sessions to inform about the low latency traffic stream characteristics and preemption parameters. In one implementation of this embodiment a non-AP STA having low latency sensitive traffic may establish a low latency traffic session with the AP with which it is associated. FIG. 16 shows a diagram that illustrates the operation of such a session.

When setting up such a session the non-AP STA (having a station management entity (SME) and a MAC) informs its counterpart of the traffic characteristics (e.g., periodicity, duration) and requirements (e.g., in points of data rate and latency bounds). Furthermore, it may inform the AP (having a SME and a MAC) that it is preemption-ready. In this case, it may additionally indicate which preemption related parameters it can support, e.g., if it can continuously or only periodically listen during the reception of a PPDU, how often it can perform CCA during a PPDU). Including these parameters within the latency traffic session request is only one possible implementation. An alternative is to indicate preemption capability and parameters within fields of the capability elements that are exchanged between the STA and AP to which it is associated.

The AP responds to the latency traffic session request with an acceptance/rejection or suggestion for alternate parameters. Specifically regarding preemption, the AP may indicate if, in order to satisfy the traffic requirements in point of latency, it may resort to truncation of ongoing data exchanges with STAs other than the LLTS requester. Furthermore, in case truncations may be performed, it also indicates parameters of the truncations, e.g. a possible truncation granularity, i.e., which is the maximum waiting time periodicity within suspendable TXOPs, whether during the maximum waiting times an uplink access is possible or only downlink. Chosen values may be indicated in scheduling intervals defined with these parameters. A framework for this may be that basically within certain scheduling intervals, certain STAs may request TXOPs, which are defined such that in between a number of PPDUs a waiting time of e.g. PIFS is defined. This information may be sent, e.g. via some setup or beacons to all STAs not only the pSTA.

The specific schedules and periodicity can be defined at the Low Latency Sensitive Traffic Stream (LLSTS or LLTS) setup. Alternatively, these can be further announced by the AP, within the setup and/or announcement of scheduling intervals for particular STAs, e.g. individual or broadcast target wake up times. In order to allow the pSTA to determine these intervals, the AP assigns an allocation ID, to which the LLTS identifier together with identifiers of the pSTA and AP are mapped. In case of broadcast wake up time intervals, an AP may indicate, within control frames carrying setup or update configuration information, that data exchanges during these intervals can be suspended for allowing high priority low latency traffic.

In case a low latency sensitive traffic has been established between the AP and pSTA, the traffic stream identifier of this traffic together with identifiers of the AP and pSTA will be contained in the PPDU transmitted after the truncation of the TXOP.

Similarly, in another implementation an AP being informed from its upper layers of the existence of a low latency sensitive traffic towards a non-AP STA may establish a low latency-sensitive session with the respective STA. In this case, the AP can include within the LLSTSReservation, an indication of whether preemption is supported and with which parameters, e.g., preemption allowed only in downlink or in both uplink and downlink, maximum waiting interval that could be allowed during a data exchange, maximum PPDU length that a pSTA may use as preemptive data if sent during a waiting interval, whether a transmission from a pSTA can be performed simultaneously with a transmission from an sSTA within a same or a different link or channel or within different links or channels, whether a transmission from a pSTA can be performed simultaneously with the reception of a transmission towards an sSTA over a different link or subchannel of a channel or over a different channel. Subsequently, the pSTA confirms whether it accepts the parameters, e.g. if it is capable of sending PPDUs with the length or format requirements needed during the waiting intervals, or it can perform the transmission in the announced links with the required parameters, if the waiting intervals duration and periodicity is enough for the latency needs of the pSTA. The low latency sensitive traffic information and low latency sensitive traffic can be setup by reusing with some modifications the TS setup mechanisms defined in the IEEE 802.11 standards.

Another embodiment enables truncations only in specific time intervals, where pSTAs are known to be awake and able to process a follow-up transmission. In this embodiment traffic stream parameters such as periodicity or latency requirements, can be exchanged by the pSTA and AP, e.g. by a regular TS. However, preemption parameters are exchanged and activated within specifically defined service periods, i.e., time intervals in which more targeted data exchanges between the AP and particular pSTAs are performed. An example of such a time interval is a TWT SP (target wake time service period). Furthermore, STAs other than the preemptive STAs should also be aware of the parameters of TXOPs, especially for UL framework.

The pSTA and AP may establish an interval in which potential transmissions corresponding to the low latency traffic characteristics can be performed. Within the setup phase, characteristics of a data exchange between the AP and pSTA can be negotiated, e.g., if the transmission from pSTA should be preceded by a trigger from the AP. Furthermore, preemption related parameters as described above, e.g. waiting interval duration and periodicity, can be chosen according to the latency traffic characteristics, and the capabilities of both AP and pSTA and other traffic requirements from within the BSS. The chosen parameters can be further negotiated between the AP and pSTA. During an established TWT SP, the pSTA also commits to being awake thus capable of hearing PPDUs exchanged over the medium on a set of negotiated links. If, during a time interval established in this manner, the pSTA observes a PPDU with a PSI, the pSTA is allowed to set the PHY-CCA to idle, immediately after determining the truncation and subsequently follows the further rules defined within the respective time interval (i.e., waits for a follow-up PPDU from the AP, containing preemptive data unit, or a frame triggering the transmission from the pSTA or starts a transmission directly).

Figure 17:
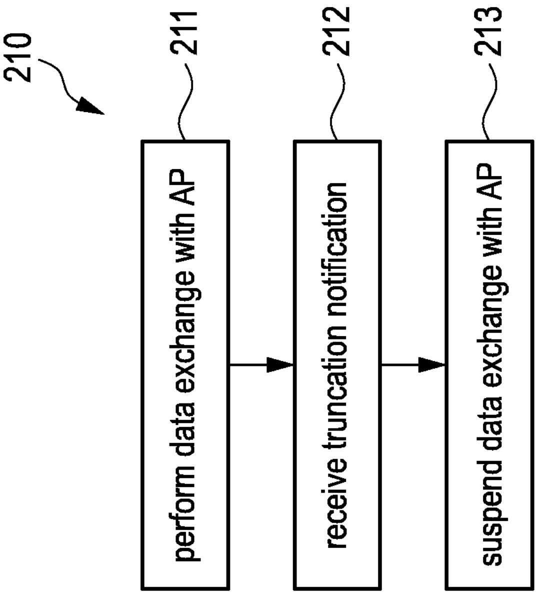
FIG. 17 shows a flow chart of an embodiment of a communication method of the second communication device according to the present disclosure.

FIG. 17 shows a flow chart of an embodiment of a second communication method 210 of the second communication device 200 (the sSTA) according to the present disclosure, which may be performed of by the circuitry 201. In a first step 211 the sSTA performs exchange of data units with the first communication device during a current transmit opportunity. In a second step 212 the sSTA receives, before or during the current transmit opportunity, a truncation notification indicating that the ongoing exchange of data units should be suspended and that a preemptive data unit may be exchanged between the first and the third communication device. In a third step 213 the sSTA suspends the ongoing exchange of data units with the first communication device before the end of the transmit opportunity.

Figure 18:
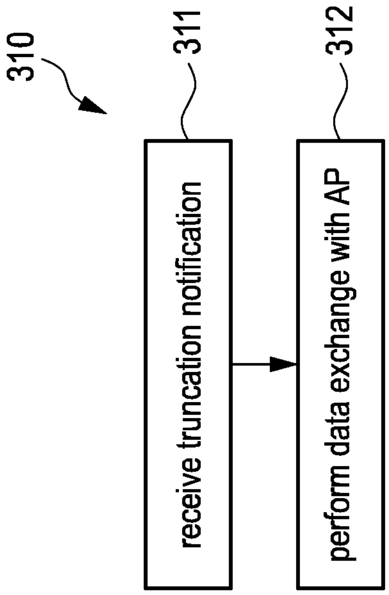
FIG. 18 shows a flow chart of an embodiment of a communication method of the third communication device according to the present disclosure.

FIG. 18 shows a flow chart of an embodiment of a third communication method 310 of the third communication device 300 (the pSTA) according to the present disclosure, which may be performed of by the circuitry 301. In a first step 311 the pSTA receives, before or during a current transmit opportunity during which exchange of data units is performed between the first communication device and the second communication device, a truncation notification indicating that the ongoing exchange of data units should be suspended and that a preemptive data unit may be received from and/or transmitted to the first communication device. In a second step 312 the pSTA receives from and/or transmit to the first communication device a preemptive data unit within the remaining duration of the transmit opportunity.

In an embodiment the pSTA determines if it may truncate the TXOP established for the traffic of sSTA. The determination is based on factors such as one or more of: PSI indication inside a PPDU, pSTA having an active LLTS, pSTA having LL TIDs and TXOP defined within scheduling intervals allowing TXOP truncations, initial TXOP duration is long TXOP, signifying that it is designed as suspendable TXOP.

In the following channel access from AP and TXOP sharing aspects that may be used in further embodiments are discussed. The TXOP has been obtained by the AP for a traffic of a particular access category, which is called a primary AC for the TXOP. In order to be able to share the TXOP with the traffic of pSTA with a different AC, the following solutions can be envisioned in embodiments.

Figure 19:
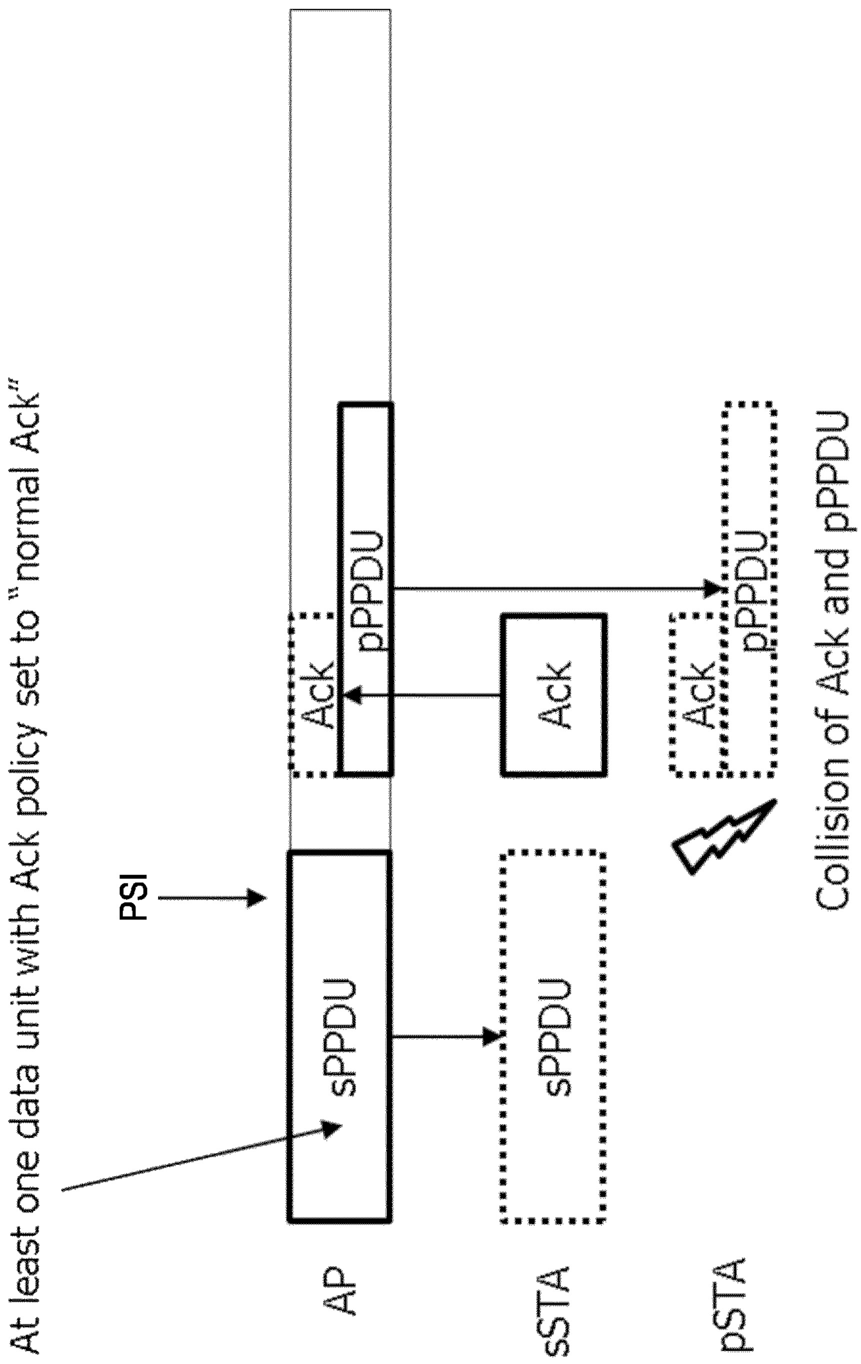
FIG. 19 shows a diagram illustrating a conventional acknowledgement policy setting.
Figure 20:
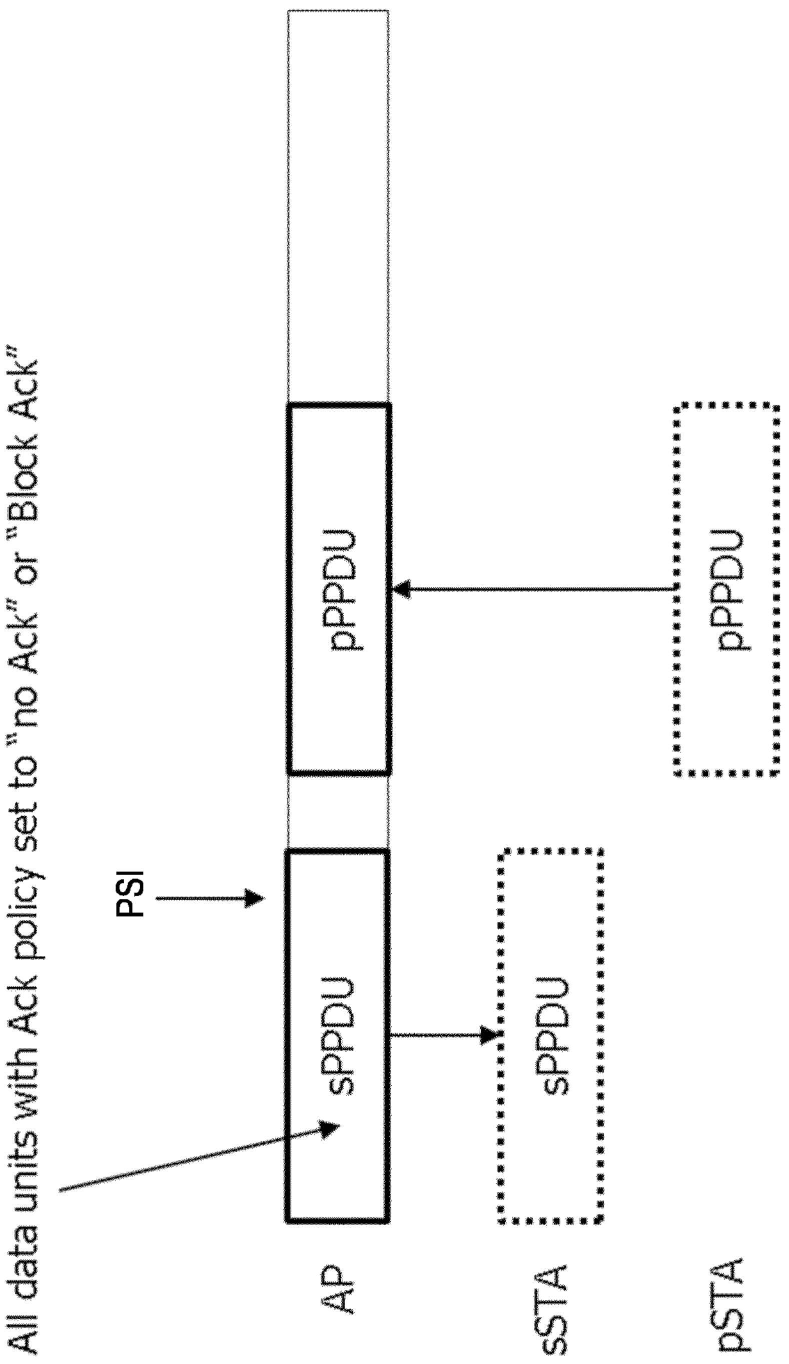
FIG. 20 shows a diagram illustrating a new acknowledgement policy setting as proposed in an embodiment of the present disclosure.

FIGS. 19 and 20 illustrates another embodiment providing a change of the acknowledgement policy. FIG. 19 shows a diagram illustrating the conventional acknowledgement policy setting. FIG. 20 shows a diagram illustrating a new acknowledgement policy setting as provided in this embodiment.

Generally, any MAC data unit holds an Ack policy field that defines the behavior for an acknowledgement to this particular data unit. For the setting of this field three relevant options exist:

i) "Normal Ack or implicit Block Ack": The recipient transmits an Acknowledgement or Block Acknowledgement after the data unit or multiple data units have been received. This means that once the PPDU, which holds the one or more data units with this Ack policy, ended, an Acknowledgement or Block Acknowledgement is transmitted SIFS after the PPDU ended. Implicit Block Acks should not be sent in the same PPDU as the ones containing PSI indication.

ii) "No Ack": The recipient takes no action upon receipt of the data unit.

iii) "Block Ack": The recipient takes no action upon the receipt of the data unit except for recording the reception state internally. The recipient can expect a Block Acknowledgement Request frame in the future to which it responds with a Block Acknowledgement, SIFS after the PPDU, which holds the Block Ack Request frame, ended.

Thus, if an ongoing exchange of data units is truncated and at least one data unit defines "Normal Ack or implicit Block Ack" as its Ack policy, an acknowledgement will be transmitted in response to the truncated PPDU. This clearly stops or hinders the transmission of a preemptive data unit to a different communication device (pSTA). Either the Acknowledgement needs to be received before a pPPDU is transmitted or it comes to a collision of the pPPDU and the Ack, which is not desired. This problem is illustrated in FIG. 19.

For this reason, the Ack policy of any data unit within an exchange of data units that can be truncated shall use an Ack policy of "No Ack" or "Block Ack". Thus, Acknowledgements from sSTA to AP are either avoided or provided on request, as shown in FIG. 120.

According to another embodiment, when establishing a TXOP in which truncation may be required (e.g., there are RTA STAs with active sessions), this is done as an MU TXOP, with MU RTS indicating both the sSTAs and pSTAs. After a truncation, a simultaneous transmission of the pPPDU as well as a fragment of the remaining sPPDU is transmitted whereas adequate padding is chosen in order to respect the oTXTIME boundary as discussed above. In this case the pPPDU1 is an MU PPDU.

According to another embodiment, the TXOP sharing rules are redesigned to allow early TXOP truncation in case the access category of pSTA corresponds to a low latency sensitive traffic or allow TXOP sharing in case an indication of low latency traffic comes at the MAC interface.

In another embodiment transmission continuation for sSTA within the TXOP may be applied. An AP may request the Acks simultaneously for the two STAs. This can be indicated by a delayed BA Request with expected response SIFS after termination of the pPPDU. The response may be in TB PPDU. Since the pPPDU is sent from the AP, the sSTA can decode the TXTIME of the pPPDU and synchronize to this such as to ensure that it can participate in the TB PPDU transmission. This operation can be particularly effective if the preempted transmission is at the end of a TXOP and/or the truncated PPDU was the last within the TXOP.

The present disclosure may make use of one or more of the following embodiments:

The truncation request comes from the pSTA on a different link during the TXOP of the sSTA. As already discussed in more detail in the above, the first pPPDU can be a trigger frame requesting or allowing the pSTA to transmit preempted data units. The transmission after the truncation can be done to pSTA simultaneously with sSTA, while respecting the TXOP boundary and PPDU boundary conditions. An initial RTS that was used to enable the TXOP is sent such that pSTA (or a set to which pSTA belongs) is also addressed in the user fields (with some form of preemption indication but not necessarily with RU), which appears in the first part regarding the early discard but is important for channel access also.

Truncation may occur within predetermined time intervals which are advertised to the STAs (most importantly pSTA or a set to which pSTA belongs but can be done to all STAs associated with the AP) in which low latency traffic has priority and STAs other than low latency are prone to early termination. In an embodiment the original transmission resumes after the preemptive data unit was conveyed in case of a short preemptive unit.

Figure 21:
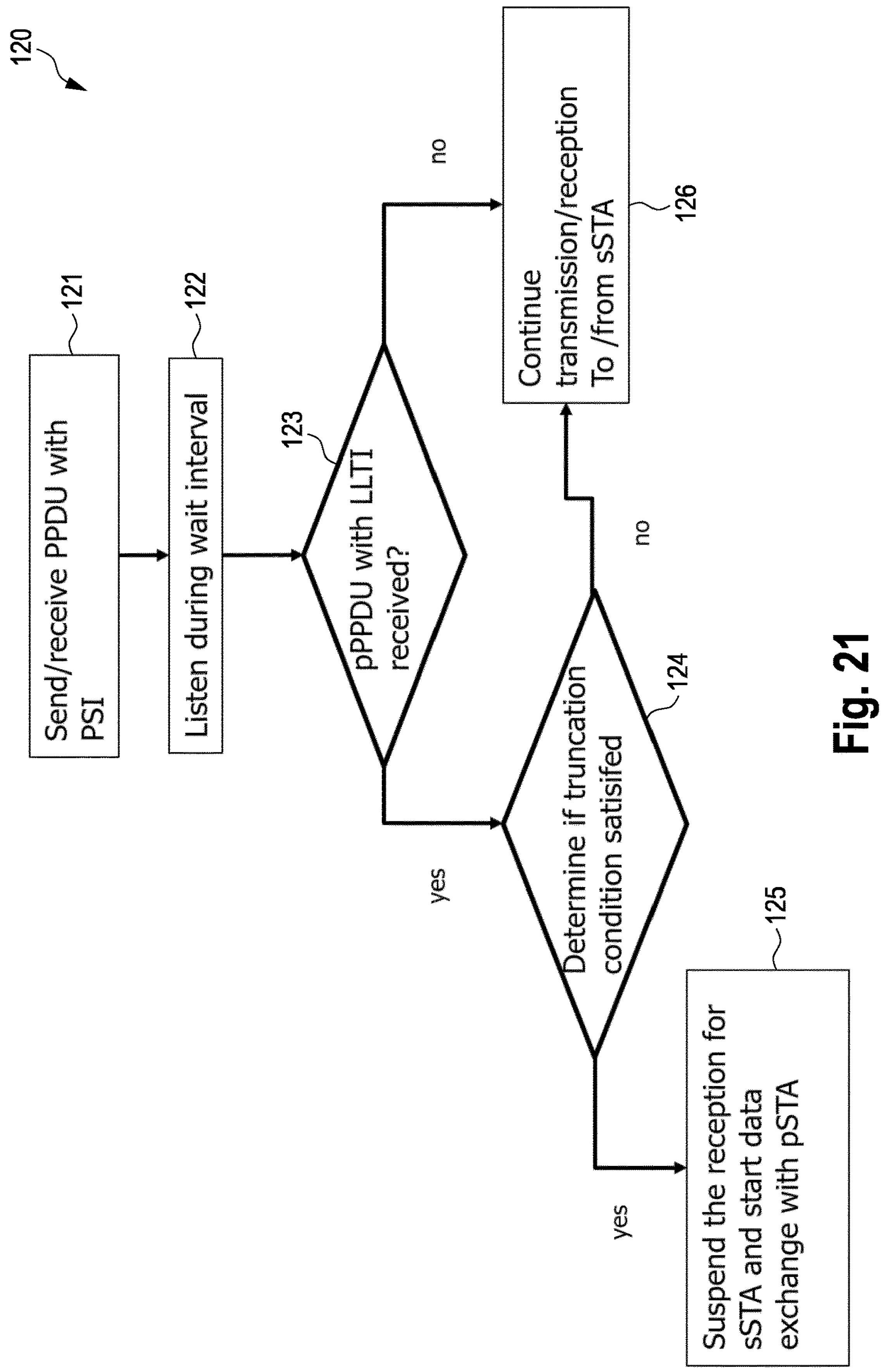
FIG. 21 shows a flow chart of another embodiment of a communication method of the first communication device according to the present disclosure.

FIG. 21 shows a flow chart of another embodiment of a first communication method 120 of the first communication device 100 (the AP) according to the present disclosure, which may be performed by the circuitry 101, in particular to operate according to the second, third or fourth scenario described above. In a first step 121 a PPDU with a suspension indicator (PSI) is sent or received. In a second step 122 the AP listens during a wait interval for reception of a PPDU. In step 123 it checks if a received PPDU is a pPPDU with a LLTI. If yes, it checks in step 124 if a truncation condition is fulfilled. Truncation conditions refers to one of the following: the received packet is from a STA which is allowed to truncate a data exchange (as announced during a scheduling interval or during a TXOP establishment), if the received packet during the waiting times contains low latency traffic with parameters such as LL traffic identifier corresponding to the ones announced during a scheduling intervals, if the remaining duration of the transmit opportunity is enough to cover a transmission from a pSTA with previously negotiated parameters (e.g., allowed PPDU duration plus applicable SIFS). In case a truncation condition is fulfilled, the data exchange with the sSTA (e.g. the reception from sSTA) is suspended and data exchange with pSTA is started in step 125. If a received PPDU is not a pPPDU with a LLTI or if the truncation condition is not fulfilled, the AP continues the data exchange with the sSTA in step 126.

Figure 22:
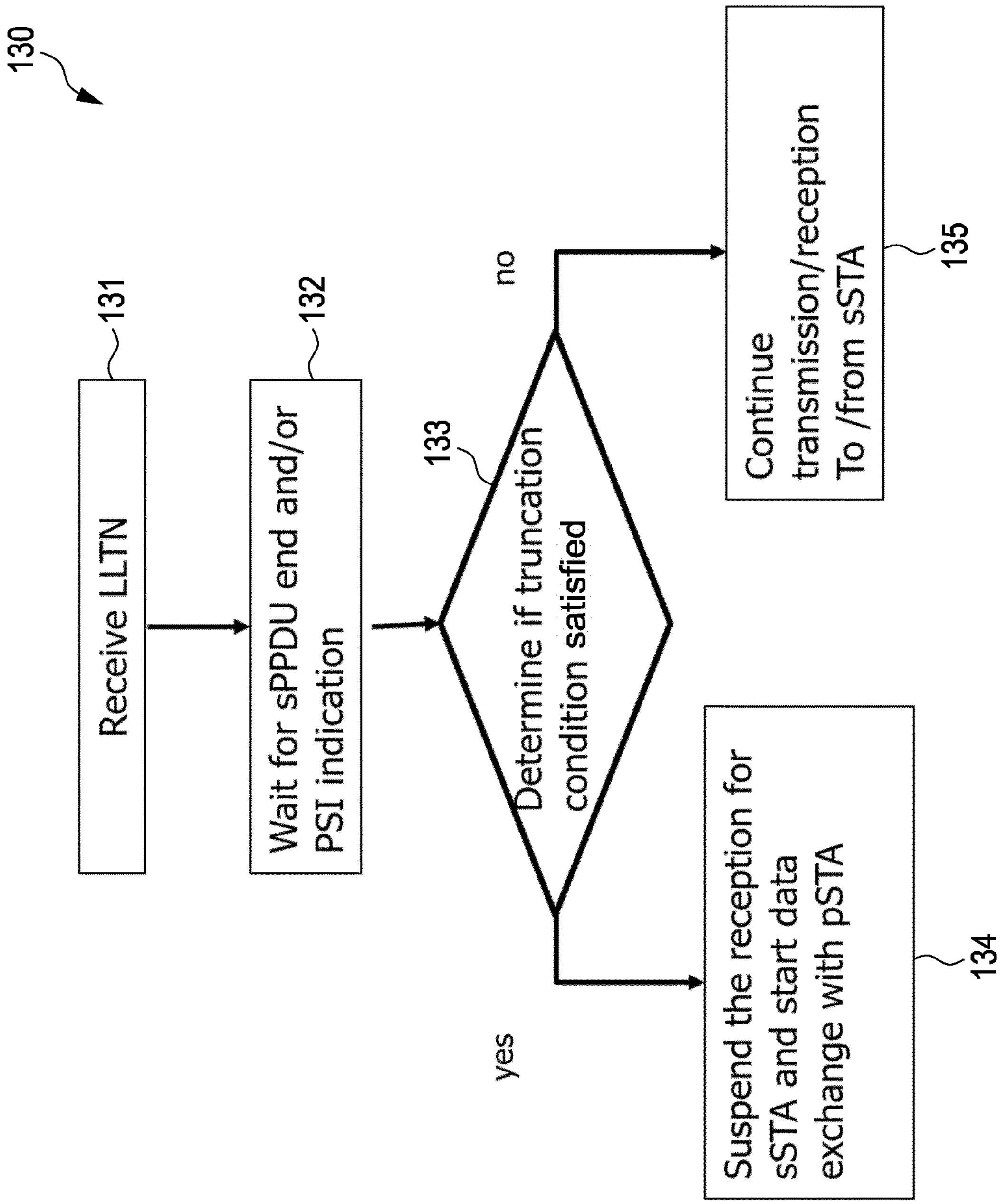
FIG. 22 shows a flow chart of another embodiment of a communication method of the first communication device according to the present disclosure.

FIG. 22 shows a flow chart of another embodiment of another embodiment of a first communication method 130 of the first communication device 100 (the AP) according to the present disclosure, which may be performed by the circuitry 101, in particular to operate according to the first or fourth scenario described above. In a first step 131 a LLTN is received, e.g. from a higher layer. In a second step 132 the AP waits for an sPPDU to end or a PSI indication. In a third step 133 the AP checks if a truncation condition is fulfilled. In case a truncation condition is fulfilled, the data exchange with the sSTA (e.g. the reception from sSTA) is suspended and data exchange with pSTA is started in step 134. If the truncation condition is not fulfilled, the AP continues the data exchange with the sSTA in step 135.

Figure 23:
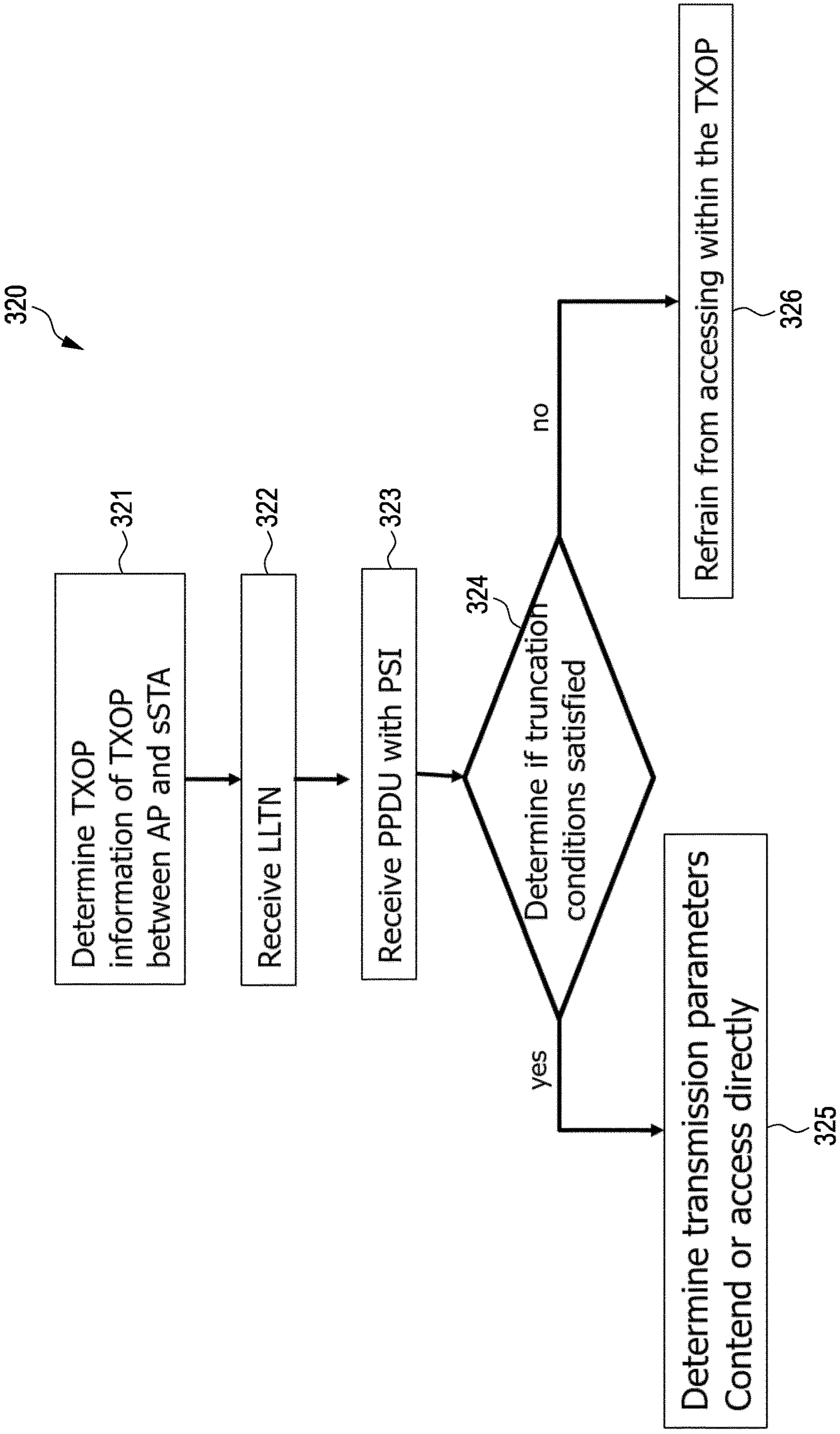
FIG. 23 shows a flow chart of an embodiment of a communication method of the third communication device according to the present disclosure.

FIG. 23 shows a flow chart of another embodiment of a third communication method 320 of the third communication device 300 (the pSTA) according to the present disclosure, which may be performed by the circuitry 301, in particular to operate according to the second, third or fourth scenario described above. In a first step 321 the pSTA determines TXOP information of the TXOP between AP and sSTA. In a second step 322 it receives a LLTN and then receives a PPDU with PSI in step 323. In step 324 the pSTA checks if a truncation condition is fulfilled. In case a truncation condition is fulfilled, the pSTA determines transmission parameters and contends or accesses the channel directly in step 325. If the truncation condition is not fulfilled, the pSTA refrains from accessing within the TXOP in step 326.

Advantages of the present disclosure include one or more of improved latency for RTA station having higher priority traffic than an ongoing transmission and enablement of TXOP truncation. TXOP truncation provides gains in latency sensitive traffic; however, channel access mechanisms for supporting TXOP truncation are currently missing making it impossible to implement these types of schemes. This limitation is addressed in this disclosure.

The present disclosure thus proposes mechanisms for channel access in case of a preemptive transmission, in which TXOP or data exchange in an ongoing TXOP is truncated to allow data transmission for another STA with high priority traffic. The embodiments presented are particularly appropriate for applications requiring real time low latency communication. Methods to ensure correct distribution of information regarding channel occupancy, sharing and respecting transmission boundaries as well as fairness in the channel access for the STAs listening to the medium are presented.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device configured to communicate with a second communication device and a third communication device, the first communication device comprising circuitry configured to
   - perform exchange of data units with the second communication device during a current transmit opportunity,
   - receive, before or during the current transmit opportunity, a truncation notification indicating that the ongoing exchange of data units should be suspended and that a preemptive data unit may be received from and/or transmitted to the third communication device,
   - suspend the ongoing exchange of data units with the second communication device before the end of the transmit opportunity, and
   - receive from and/or transmit to the third communication device the preemptive data unit within the remaining duration of the transmit opportunity.

2. First communication device as defined in embodiment 1,
   - wherein the circuitry is configured to receive the truncation notification from
     - a higher layer and/or a non-empty queue holding high priority data units to be transmitted to the third communication device and/or
     - an entity within the first communication device that initiates a preemptive period or instructs the first and/or second communication device that within the transmit opportunity one or more preemptive periods should be inserted in the data exchange and/or
     - the third communication device.

3. First communication device as defined in any one of the preceding embodiments, wherein the circuitry is configured to transmit the preemptive data unit to the third communication device after termination of reception or transmission of a complete data unit from or to the second communication device.

4. First communication device as defined in any one of the preceding embodiments, wherein the circuitry is configured to
   - transmit a suspend indication indicating to the second and third communication devices a preemptive period during which the second communication device should not transmit a data unit and the third communication device can start transmitting the preemptive data unit,
   - listen to reception of the preemptive data unit from the third communication device or transmit the preemptive data unit to the third communication device during the preemptive period, and
   - continue transmitting or receiving data units to or from the second communication device in case no preemptive data unit is received during the preemptive period from the third communication device.

5. First communication device as defined in any one of the preceding embodiments, wherein the circuitry is configured to
   - receive a suspend indication from the second communication device, indicating a preemptive period during which the second communication device should not transmit a data unit and the first and/or third communication device can start transmitting the preemptive data unit, listen to reception of the preemptive data unit from the third communication device or transmit the preemptive data unit to the third communication device during the preemptive period, and resume reception of data units from the second communication device in case no preemptive data unit is received from or is transmitted to the third communication device during the preemptive period.

6. First communication device as claimed in claim 5, wherein the circuitry is configured to listen to reception of the preemptive data unit from the third communication device and suspend the data exchange with the second communication device after the next PPDU, containing a suspend indication, by transmitting a preemptive data unit with a truncation indication to at least the third communication device, the truncation indication indicating that a preemptive data unit should be transmitted to or received from the third communication device.

7. First communication device as defined in any one of the preceding embodiments, wherein the circuitry is configured to perform data exchange with the second communication device over a first link or first set of channels or a first set of subchannels and to receive a data unit with truncation indication on a second link or a second set of channels or second set of a subchannels, wherein the transmit opportunity is established over the first and second link or the first and second set of channels or the first and second set of subchannels.

8. First communication device as defined in any one of the preceding embodiments, wherein the circuitry is configured to transmit a truncation indication in a data unit containing additionally acknowledgement information towards the second communication device.

9. First communication device as defined in any one of the preceding embodiments, wherein the circuitry is configured to suspend the ongoing exchange of data units with the second communication device before all data units of the data exchange, for which the transmission opportunity has been established, have been sent.

10. First communication device as defined in any one of the preceding embodiments, wherein the circuitry is configured to perform the suspension of the ongoing data exchange by transmitting a data unit including a truncation indication to at least the third communication device and optionally to the second communication device and/or by interrupting the reception of data units from the second communication device after receiving a suspend indication from the second communication device followed by a truncation indication from the third communication device.

11. First communication device as defined in any one of the preceding embodiments, wherein the circuitry is configured to receive as a truncation notification a suspension notification, indicating that one or more preemptive periods should be inserted within the data exchange between the first and second communication devices and a suspend indication should be included within the PPDU immediately preceding the preemptive period.

12. First communication device as defined in any one of the preceding embodiments, wherein the circuitry is configured to set in the ongoing exchange of data units with the second communication device the acknowledgement policy of a data unit to no acknowledgement or acknowledgement on request and/or to transmit a suspend indication only in a data unit which contains no immediate acknowledgement request.

13. First communication device as defined in any one of the preceding embodiments, wherein the circuitry is configured to transmit, as part of the ongoing exchange of data units with the second communication device, a first duration indicator indicating the intended duration of the transmit opportunity, and transmit or receive, after the suspension of the ongoing exchange of data units and as part of the reception or transmission of a data unit from or to the third communication device, a second duration indicator indicating the remaining duration of the transmit opportunity after the transmission of the preemptive data unit is completed.

14. First communication device as defined in any one of the preceding embodiments, wherein the circuitry is configured to transmit a truncation indication within a data unit suspending the ongoing exchange of data units with the second communication device only if the remaining duration of the transmit opportunity is equal to or larger than a minimum expected duration of the transmission or reception of the preemptive data unit and any required response to the transmitted or received preemptive data unit or of a frame triggering or scheduling the transmission of the preemptive data unit and any required response to the transmitted or received frame or of the preemptive data unit plus one or more applicable short interframe spaces or other margins.

15. First communication device as defined in any one of the preceding embodiments, wherein the circuitry is configured to resume the data exchange with the second communication device after the exchange of one or more preemptive data units with the third communication device is finished, if there is sufficient time remaining in the transmit opportunity.

16. First communication device as defined in any one of the preceding embodiments, wherein the circuitry is configured to perform a suspension of the ongoing data exchange with the second communication device as a result of receiving a notification indicating the request to transmit or receive a low latency sensitive traffic, from the third communication device, during the transmit opportunity of the second communication device.

17. First communication device as defined in any one of the preceding embodiments, wherein the circuitry is configured to transmit, as first preemptive data unit one or more of, a frame containing a truncation indication;

a trigger frame requesting and/or allowing the third communication device to transmit further preemptive data units during the transmit opportunity obtained for the data exchange between the first communication device and the second communication device;

a frame only containing traffic corresponding to a low latency traffic stream identifier; and an end notification indicating the end of the current transmit opportunity before the end of the data frames for which the transmit opportunity has been established.

18. First communication device as defined in any one of the preceding embodiments, wherein the circuitry is configured to transmit and/or receive one or more preemptive data units to and/or from the third communication device simultaneously with the transmission and/or reception of data units to and/or from the second communication device and/or to transmit and/or receive preemptive data units to and/or from the third communication device that only contain traffic corresponding to a low latency traffic stream identifier, established between the first communication device and the third communication device before the ongoing data exchange.

19. First communication device as defined in any one of the preceding embodiments, wherein the circuitry is configured to transmit as part of establishing the transmit opportunity with the second communication device, within which the ongoing data exchange is performed, one or more of a control frame containing one or more of an indication of a potential preemption;

a user field indicating the third communication device as intended receiver of a preemptive data unit or as allowed transmitter of a preemptive data unit;

an user field indicating a set of communication devices, from which the third communication device identifies itself as intended participant in a potential preemptive data exchange;

an indication that preemptive periods should be inserted within the data unit exchange; and an indication of a shared transmit opportunity.

20. First communication device as defined in any one of the preceding embodiments, wherein the circuitry is configured to perform a suspension of the ongoing exchange of data units in predefined time intervals negotiated or set up with the second and third communication device before the ongoing transmit opportunity.

21. First communication device as claimed in claim 20, wherein the circuitry is configured to negotiate or set up one or more of the following parameters:

maximum length of a data unit that can be transmitted by a second communication device;

maximum length of a preemptive data unit that can be transmitted by a third communication device during a preemptive period;

maximum contiguous transmission time without a preemptive period;

length of preemptive period;

indication of third communication devices that can participate in data exchange of a preemptive data unit with the first communication device;

indication of second communication devices that may request for transmit opportunities with longer durations than the current transmit opportunity;

maximum length of a transmit opportunity defined with preemptive periods, wherein the duration may be longer than the maximum duration for transmit opportunities without preemptive periods;

if contention should be used by third communication device in accessing the medium during a preemptive period; and which EDCA parameters should be used by third communication device in accessing the medium during a preemptive period.

22. First communication device as defined in any one of the preceding embodiments, wherein the duration of the preemptive period is priority interframe space (PIFS) or defined to cover at least a maximum duration of the preemptive data unit with truncation indication and corresponding interframe spacings.

23. First communication device as defined in any one of the preceding embodiments, wherein the circuitry is configured to receive and/or transmit an end notification indicating the end of the current transmit opportunity before the end of the current transmit opportunity, and establish a new transmit opportunity with the third communication device, wherein the duration of said new transmit opportunity covers at least the transmission of the preemptive data to and/or the reception of the preemptive data from the third communication device.

24. First communication device as defined in any one of the preceding embodiments, wherein the circuitry is configured to end or to share the current transmit opportunity with the third communication device in case an access category of the traffic to be exchanged with the third communication device indicates a low latency sensitive access category and/or in case a low latency sensitive session had been established between the first and the third communication device before the ongoing data exchange.

25. Second communication device configured to communicate with a first communication device and a third communication device, the second communication device comprising circuitry configured to perform exchange of data units with the first communication device during a current transmit opportunity, receive, before or during the current transmit opportunity, a truncation notification indicating that the ongoing exchange of data units should be suspended and that a preemptive data unit may be exchanged between the first and the third communication device, and suspend the ongoing exchange of data units with the first communication device before the end of the transmit opportunity.

26. Second communication device as defined in embodiment 25, wherein the circuitry is configured to send an end notification, terminating the current transmit opportunity before all data units to the first communication device have been sent, if a data unit with a truncation indication has been received from the first or third communication device.

27. Second communication device as defined in embodiment 25 or 26, wherein the circuitry is configured to receive, as truncation notification, a truncation indication from the first or third communication device, the truncation indication indicating the presence of low latency traffic that can truncate the ongoing transmit opportunity or a suspend notification from the first communication device or an upper layer, the suspend notification indicating that the transmit opportunity can be established or should be established with preemptive periods.

28. Third communication device configured to communicate with a first communication device, the third communication device comprising circuitry configured to receive, before or during a current transmit opportunity during which exchange of data units is performed between the first communication device and the second communication device, a truncation notification indicating that the ongoing exchange of data units should be suspended and that a preemptive data unit may be received from and/or transmitted to the first communication device, and receive from and/or transmit to the first communication device a preemptive data unit within the remaining duration of the transmit opportunity.

29. Third communication device as defined in embodiment 28, wherein the circuitry is configured to receive a suspend indication from the second communication device, indicating a preemptive period during which the second communication device shall not transmit a data unit and the first and/or third communication device can start transmitting the preemptive data unit and transmit the preemptive data unit to the first communication device and/or receive the preemptive data unit from the first communication device during the preemptive period.

30. Third communication device as defined in embodiment 28 or 29, wherein the circuitry is configured to reset a network allocation vector, NAV, before the end of the ongoing transmit opportunity and/or before the end of the intended duration of the data unit from the first to the second communication device upon determination of one or more of:

an intentional early termination of the ongoing data exchange, reception of a trigger frame requesting a preemptive data unit transmission from the third communication device, reception of a preemptive data unit with a request for response and a time interval defined with potential truncation indication.

31. Third communication device as defined in embodiment 28, 29 or 30, wherein the circuitry is configured to attempt a channel access only if one or more of the following conditions is satisfied:

a truncation notification in form of a suspend indication, indicating the start of a preemptive period, has been received from a second or first device;

a truncation notification in form of a truncation indication has been received from a first communication device, requesting response from the third communication device;

a truncation notification was received from upper layers or an entity at the third communication device indicating a low latency traffic is queued at the third communication device;

a low latency traffic session has been established with the first communication device;

a frame was received from the first communication device, containing an identifier of the third station as allowed participant in the transmit opportunity;

a scheduling interval with truncation parameters has been set up by the first communication device or negotiated between the first and third communication device, wherein the third communication device is indicated as allowed transmitter of preemptive data units;

a backoff counter reached 0 during a preemptive period; and the duration of a preemptive data unit is smaller than the duration of a preemptive period minus applicable short interframe spaces.

32. First communication method of a first communication device for communicating with a second communication device and a third communication device, the first communication method comprising performing exchange of data units with the second communication device during a current transmit opportunity, receiving, before or during the current transmit opportunity, a truncation notification indicating that the ongoing exchange of data units should be suspended and that a preemptive data unit may be received from and/or transmitted to the third communication device, suspending the ongoing exchange of data units with the second communication device before the end of the transmit opportunity, and receiving from and/or transmit to the third communication device the preemptive data unit within the remaining duration of the transmit opportunity.

33. Second communication method of a second communication device for communicating with a first communication device and a third communication device, the second communication method comprising performing exchange of data units with the first communication device during a current transmit opportunity, receiving, before or during the current transmit opportunity, a truncation notification indicating that the ongoing exchange of data units should be suspended and that a preemptive data unit may be exchanged between the first and the third communication device, and suspending the ongoing exchange of data units with the first communication device before the end of the transmit opportunity.

34. Third communication method of a third communication device for communicating with a first communication device, the third communication device comprising receiving, before or during a current transmit opportunity during which exchange of data units is performed between the first communication device and the second communication device, a truncation notification indicating that the ongoing exchange of data units should be suspended and that a preemptive data unit may be received from and/or transmitted to the first communication device, and receiving from and/or transmit to the first communication device a preemptive data unit within the remaining duration of the transmit opportunity.

35. A non-transitory computer-readable recording medium that stores therein a computer program product, which, when executed by a processor, causes the method according to embodiment 32, 33 or 34 to be performed.

36. A computer program comprising program code means for causing a computer to perform the steps of said method according to embodiment 32, 33 or 34 when said computer program is carried out on a computer.

The invention claimed is:

1. First communication device configured to communicate with a second communication device and a third communication device, the first communication device comprising circuitry configured to perform exchange of data units with the second communication device during a current transmit opportunity, receive, before or during the current transmit opportunity, a truncation notification indicating that the ongoing exchange of data units should be suspended and that a preemptive data unit may be received from and/or transmitted to the third communication device, suspend the ongoing exchange of data units with the second communication device before the end of the transmit opportunity, and receive from and/or transmit to the third communication device the preemptive data unit within the remaining duration of the transmit opportunity.

2. First communication device as claimed in claim 1, wherein the circuitry is configured to transmit a suspend indication indicating to the second and third communication devices a preemptive period during which the second communication device should not transmit a data unit and the third communication device can start transmitting the preemptive data unit, listen to reception of the preemptive data unit from the third communication device or transmit the preemptive data unit to the third communication device during the preemptive period, and continue transmitting or receiving data units to or from the second communication device in case no preemptive data unit is received during the preemptive period from the third communication device.

3. First communication device as claimed in claim 1, wherein the circuitry is configured to receive a suspend indication from the second communication device, indicating a preemptive period during which the second communication device should not transmit a data unit and the first and/or third communication device can start transmitting the preemptive data unit, listen to reception of the preemptive data unit from the third communication device or transmit the preemptive data unit to the third communication device during the preemptive period, and resume reception of data units from the second communication device in case no preemptive data unit is received from or is transmitted to the third communication device during the preemptive period.

4. First communication device as claimed in claim 1, wherein the circuitry is configured to listen to reception of the preemptive data unit from the third communication device and suspend the data exchange with the second communication device after a next PPDU, containing a suspend indication, by transmitting a preemptive data unit with a truncation indication to at least the third communication device, the truncation indication indicating that a preemptive data unit should be transmitted to or received from the third communication device.

5. First communication device as claimed in claim 1, wherein the circuitry is configured to perform data exchange with the second communication device over a first link or first set of channels or a first set of subchannels and to receive a data unit with truncation indication on a second link or a second set of channels or second set of a subchannels, wherein the transmit opportunity is established over the first and second link or the first and second set of channels or the first and second set of subchannels.

6. First communication device as claimed in claim 1, wherein the circuitry is configured to transmit a truncation indication in a data unit containing additionally acknowledgement information towards the second communication device and/or to perform the suspension of the ongoing data exchange by transmitting a data unit including a truncation indication to at least the third communication device and/or by interrupting the reception of data units from the second communication device after receiving a suspend indication from the second communication device followed by a truncation indication from the third communication device.

7. First communication device as claimed in claim 1, wherein the circuitry is configured to receive as a truncation notification a suspension notification, indicating that one or more preemptive periods should be inserted within the data exchange between the first and second communication devices and a suspend indication should be included within a PPDU immediately preceding the preemptive period.

8. First communication device as claimed in claim 1, wherein the circuitry is configured to transmit, as part of the ongoing exchange of data units with the second communication device, a first duration indicator indicating the intended duration of the transmit opportunity, and transmit or receive, after the suspension of the ongoing exchange of data units and as part of the reception or transmission of a data unit from or to the third communication device, a second duration indicator indicating the remaining duration of the transmit opportunity after the transmission of the preemptive data unit is completed.

9. First communication device as claimed in claim 1, wherein the circuitry is configured to transmit a truncation indication within a data unit suspending the ongoing exchange of data units with the second communication device only if the remaining duration of the transmit opportunity is equal to or larger than a minimum expected duration of the transmission or reception of the preemptive data unit and any required response to the transmitted or received preemptive data unit or of a frame triggering or scheduling the transmission of the preemptive data unit and any required response to the transmitted or received frame or of the preemptive data unit plus one or more applicable short interframe spaces or other margins.

10. First communication device as claimed in claim 1, wherein the circuitry is configured to transmit, as first preemptive data unit one or more of, a frame containing a truncation indication;

a trigger frame requesting and/or allowing the third communication device to transmit further preemptive data units during the transmit opportunity obtained for the data exchange between the first communication device and the second communication device;

a frame only containing traffic corresponding to a low latency traffic stream identifier; and an end notification indicating the end of the current transmit opportunity before the end of the data frames for which the transmit opportunity has been established.

11. First communication device as claimed in claim 1, wherein the circuitry is configured to transmit and/or receive one or more preemptive data units to and/or from the third communication device simultaneously with the transmission and/or reception of data units to and/or from the second communication device and/or to transmit and/or receive preemptive data units to and/or from the third communication device that only contain traffic corresponding to a low latency traffic stream identifier, established between the first communication device and the third communication device before the ongoing data exchange.

12. Second communication device configured to communicate with a first communication device and a third communication device, the second communication device comprising circuitry configured to perform exchange of data units with the first communication device during a current transmit opportunity, receive, before or during the current transmit opportunity, a truncation notification indicating that the ongoing exchange of data units should be suspended and that a preemptive data unit may be exchanged between the first and the third communication device, and suspend the ongoing exchange of data units with the first communication device before the end of the transmit opportunity.

13. Second communication device as claimed in claim 12, wherein the circuitry is configured to send an end notification, terminating the current transmit opportunity before all data units to the first communication device have been sent, if a data unit with a truncation indication has been received from the first or third communication device, and/or to receive, as truncation notification, a truncation indication from the first or third communication device, the truncation indicating indicating the presence of low latency traffic that can truncate the ongoing transmit opportunity or a suspend notification from the first communication device or an upper layer, the suspend notification indicating that the transmit opportunity can be established or should be established with preemptive periods.

14. Third communication device configured to communicate with a first communication device, the third communication device comprising circuitry configured to receive, before or during a current transmit opportunity during which exchange of data units is performed between the first communication device and a second communication device, a truncation notification indicating that the ongoing exchange of data units should be suspended and that a preemptive data unit may be received from and/or transmitted to the first communication device, and receive from and/or transmit to the first communication device a preemptive data unit within the remaining duration of the transmit opportunity.

15. Third communication device as claimed in claim 14, wherein the circuitry is configured to receive a suspend indication from the second communication device, indicating a preemptive period during which the second communication device shall not transmit a data unit and the first and/or third communication device can start transmitting the preemptive data unit and transmit the preemptive data unit to the first communication device and/or receive the preemptive data unit from the first communication device during the preemptive period.

16. Third communication device as claimed in claim 14, wherein the circuitry is configured to attempt a channel access only if one or more of the following conditions is satisfied:

the truncation notification in form of a suspend indication, indicating the start of a preemptive period, has been received from the first or second communication device;

the truncation notification in form of a truncation indication has been received from a first communication device, requesting response from the third communication device;

the truncation notification was received from upper layers or an entity at the third communication device indicating a low latency traffic is queued at the third communication device;

a low latency traffic session has been established with the first communication device;

a frame was received from the first communication device, containing an identifier of the third communication device as allowed participant in the transmit opportunity;

a scheduling interval with truncation parameters has been set up by the first communication device or negotiated between the first and third communication device, wherein the third communication device is indicated as allowed transmitter of preemptive data units;

a backoff counter reached 0 during a preemptive period; and the duration of a preemptive data unit is smaller than the duration of a preemptive period minus applicable short interframe spaces.

17. First communication method of a first communication device for communicating with a second communication device and a third communication device, the first communication method comprising performing exchange of data units with the second communication device during a current transmit opportunity, receiving, before or during the current transmit opportunity, a truncation notification indicating that the ongoing exchange of data units should be suspended and that a preemptive data unit may be received from and/or transmitted to the third communication device, suspending the ongoing exchange of data units with the second communication device before the end of the transmit opportunity, and receiving from and/or transmit to the third communication device the preemptive data unit within the remaining duration of the transmit opportunity.

18. Second communication method of a second communication device for communicating with a first communication device and a third communication device, the second communication method comprising performing exchange of data units with the first communication device during a current transmit opportunity, receiving, before or during the current transmit opportunity, a truncation notification indicating that the ongoing exchange of data units should be suspended and that a preemptive data unit may be exchanged between the first and the third communication device, and suspending the ongoing exchange of data units with the first communication device before the end of the transmit opportunity.

19. Third communication method of a third communication device for communicating with a first communication device, the third communication method comprising receiving, before or during a current transmit opportunity during which exchange of data units is performed between the first communication device and the second communication device, a truncation notification indicating that the ongoing exchange of data units should be suspended and that a preemptive data unit may be received from and/or transmitted to the first communication device, and receiving from and/or transmit to the first communication device a preemptive data unit within the remaining duration of the transmit opportunity.

20. A non-transitory computer-readable recording medium that stores therein a computer program product, which, when executed by a processor, causes the method according to claim 17, 18 or 19 to be performed.

* * * * *